United States Patent
Suzuki et al.

(10) Patent No.: US 9,210,351 B2
(45) Date of Patent: Dec. 8, 2015

(54) SIGNAL TRANSMISSION APPARATUS AND SIGNAL TRANSMISSION METHOD

(71) Applicant: Kabushiki Kaisha Toshiba, Tokyo (JP)

(72) Inventors: Nobuaki Suzuki, Akishima (JP); Takashi Doi, Fuchu (JP); Masahiko Mawatari, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 238 days.

(21) Appl. No.: 13/790,789

(22) Filed: Mar. 8, 2013

(65) Prior Publication Data

US 2013/0308059 A1    Nov. 21, 2013

(30) Foreign Application Priority Data

May 18, 2012   (JP) .................................. 2012-115096
Aug. 7, 2012   (JP) .................................. 2012-175452

(51) Int. Cl.

| H04B 3/00 | (2006.01) |
|---|---|
| H04L 25/00 | (2006.01) |
| H04N 5/38 | (2006.01) |
| H04N 21/4363 | (2011.01) |

(52) U.S. Cl.
CPC .......... *H04N 5/38* (2013.01); *H04N 21/43635* (2013.01); *G09G 2370/12* (2013.01)

(58) Field of Classification Search
CPC   H04N 5/38; H04N 21/43635; G09G 2370/12
USPC ......................................... 375/257; 348/723
See application file for complete search history.

(56) References Cited

U.S. PATENT DOCUMENTS

| 7,440,702 | B2 | 10/2008 | Imai | |
|---|---|---|---|---|
| 7,822,143 | B2 | 10/2010 | Kikuchi | |
| 2009/0290671 | A1* | 11/2009 | Rea et al. ....................... | 375/371 |
| 2010/0085482 | A1* | 4/2010 | Toba et al. ..................... | 348/554 |
| 2013/0148030 | A1* | 6/2013 | Kitaru et al. .................. | 348/723 |

FOREIGN PATENT DOCUMENTS

| JP | 3014309 | 2/2000 |
|---|---|---|
| JP | 2005-514873 | 5/2005 |
| JP | 4192802 | 12/2008 |
| JP | 4254492 | 4/2009 |
| WO | 03/058946 | 7/2003 |

OTHER PUBLICATIONS

Joseph Cornwall, "An Introduction to TMDS—Understanding DVI-D HDMI and Display Port Signals," 2011 BICSI U.S. Western Region Meeting, Aug. 19, 2011, Boise, ID.*

* cited by examiner

*Primary Examiner* — Nader Bolourchi
(74) *Attorney, Agent, or Firm* — William W. Schaal; Rutan & Tucker, LLP

(57) ABSTRACT

According to one embodiment, a signal transmission apparatus being AC-coupled with a receiving apparatus through a digital transmission line includes a transmitting module configured to transmit a differential signal based on an encoded bit serial input signal such that a low frequency component of the differential signal to be transmitted is maintained at a constant level when the differential signal based on the encoded bit serial input signal is transmitted to the digital transmission line where the encoded bit serial input signal includes a ratio of the number of logic 1 to the number of logic 0 which is different from 5:5.

17 Claims, 17 Drawing Sheets

FIG. 6A

| TRANSMISSION LINE | DE | INPUT SIGNAL | | OUTPUT SIGNAL |
|---|---|---|---|---|
| Ch0 | 0 | V-Sync | H-Sync | 4 TYPES OF 10-BIT CODE |
| Ch1 | 0 | CTL1 | CTL0 | |
| Ch2 | 0 | CTL3 | CTL2 | |
| Ch0 | 1 | B[7:0] | | 256 TYPES OF 10-BIT CODE |
| Ch1 | 1 | G[7:0] | | |
| Ch2 | 1 | R[7:0] | | |

FIG. 6B

| TRANSMISSION LINE STATE Ch0 - Ch2 | INPUT SIGNAL | | OUTPUT SIGNAL 10-BIT CODE |
|---|---|---|---|
| | V-Sync CTL1 CTL3 | H-Sync CTL0 CTL2 | |
| STATE 0 | 0 | 0 | 0010101011 |
| STATE 1 | 0 | 1 | 1101010110 |
| STATE 2 | 1 | 0 | 0010101010 |
| STATE 3 | 1 | 1 | 1101010101 |

FIG. 8

| OUTPUT STATE | OUTPUT SIGNAL 10-BIT CODE | DC COMPONENT LEVEL | CORRECTION LEVEL | DC COMPONENT LEVEL AFTER CORRECTION |
|---|---|---|---|---|
| STATE 0 | 0010101011 | 50% | -10% | 40% |
| STATE 1 | 1101010110 | 50% | -10% | 40% |
| STATE 2 | 0010101010 | 40% | 0% | 40% |
| STATE 3 | 1101010101 | 60% | -20% | 40% |

FIG. 15

| OUTPUT STATE | OUTPUT SIGNAL 10-BIT CODE | DC COMPONENT LEVEL | FIRST CORRECTION LEVEL | SECOND CORRECTION LEVEL | DC COMPONENT LEVEL AFTER CORRECTION |
|---|---|---|---|---|---|
| STATE 0 | 0010101011 | 50% | -5% | -5% | 40% |
| STATE 1 | 1101010110 | 50% | -5% | -5% | 40% |
| STATE 2 | 0010101010 | 40% | 0% | -10% | 30% |
| STATE 3 | 1101010101 | 60% | -10% | 0% | 50% |

SIGNAL TRANSMISSION APPARATUS AND SIGNAL TRANSMISSION METHOD

CROSS-REFERENCE TO RELATED APPLICATION(S)

The application is based upon and claims the benefit of priority from Japanese Patent Applications No. 2012-115096 filed on May 18, 2012, and No. 2012-175452 filed on Aug. 7, 2012, the entire content of which are incorporated herein by reference.

FIELD

Embodiments of the present invention relate to a signal source device and a signal transmission method that transmits a differential signal.

BACKGROUND

In the High-Definition Multimedia Interface (HDMI) specification (e.g., version 1.4b released on Oct. 11, 2011) of image source devices such as DVD/STB or image sink devices such as TV that transmits or receives the signals through three digital transmission lines, eight bits for each pixel signal of three colour components (R, G, B) of an image signal and two bits for each of control signals to be transmitted during a blanking period of the image signal are converted (encoded) into ten bits, respectively, to be transmitted serially over the three-channel transmission lines. This encoding scheme is referred to as Transmission Minimized Differential Signal (TMDS).

Large-scale integrated circuits manufactured by employing a micro-lithography can be preferably utilized so as to reduce the cost of a high-speed serial driving circuit of a HDMI transmitting module.

However, in the HDMI specification, when transmitting signals serially between an HDMI transmitting module and an HDMI receiving module, which are connected via an HDMI cable, a scheme of DC coupling between a termination resistor of the HDMI receiving module pulled up to 3.3V and the HDMI transmitting module is utilized. The high speed serial driving circuit of the HDMI transmitting module is required to withstand the voltage characteristics corresponding to the pulled up voltage.

Therefore, it is difficult to utilize a large scale integrated circuit having a low withstand voltage characteristics as the high speed serial driving circuit of the HDMI transmitting module.

Accordingly, the embodiments of the present invention intend to provide a signal transmission apparatus and a signal transmission method in which the signals can be transmitted to a signal receiving device with suppressing the influence of the voltage of the signal receiving device which is pulled up to a predetermined voltage.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

FIGS. 6A and 6B are views for illustrating input/output signals of the TMDS encoder/parallel-to-serial conversion module of the HDMI source device.

FIG. 8 is a view for illustrating examples of a compensation amount of data encoded by the HDMI source device according to the embodiment.

FIG. 15 is a view for illustrating examples of the compensating amount of data encoded by the HDMI source device according to the second embodiment.

DETAILED DESCRIPTION

Hereinafter, the embodiment will be described with reference to the accompanying drawings.

According to one embodiment, a signal transmission apparatus being AC-coupled with a receiving apparatus through a digital transmission line includes a transmitting module configured to transmit a differential signal based on an encoded bit serial input signal such that a low frequency component of the differential signal to be transmitted is maintained at a constant level when the differential signal based on the encoded bit serial input signal is transmitted to the digital transmission line where the encoded bit serial input signal includes a ratio of the number of logic 1 to the number of logic 0 which is different from 5:5.

Figure 1:
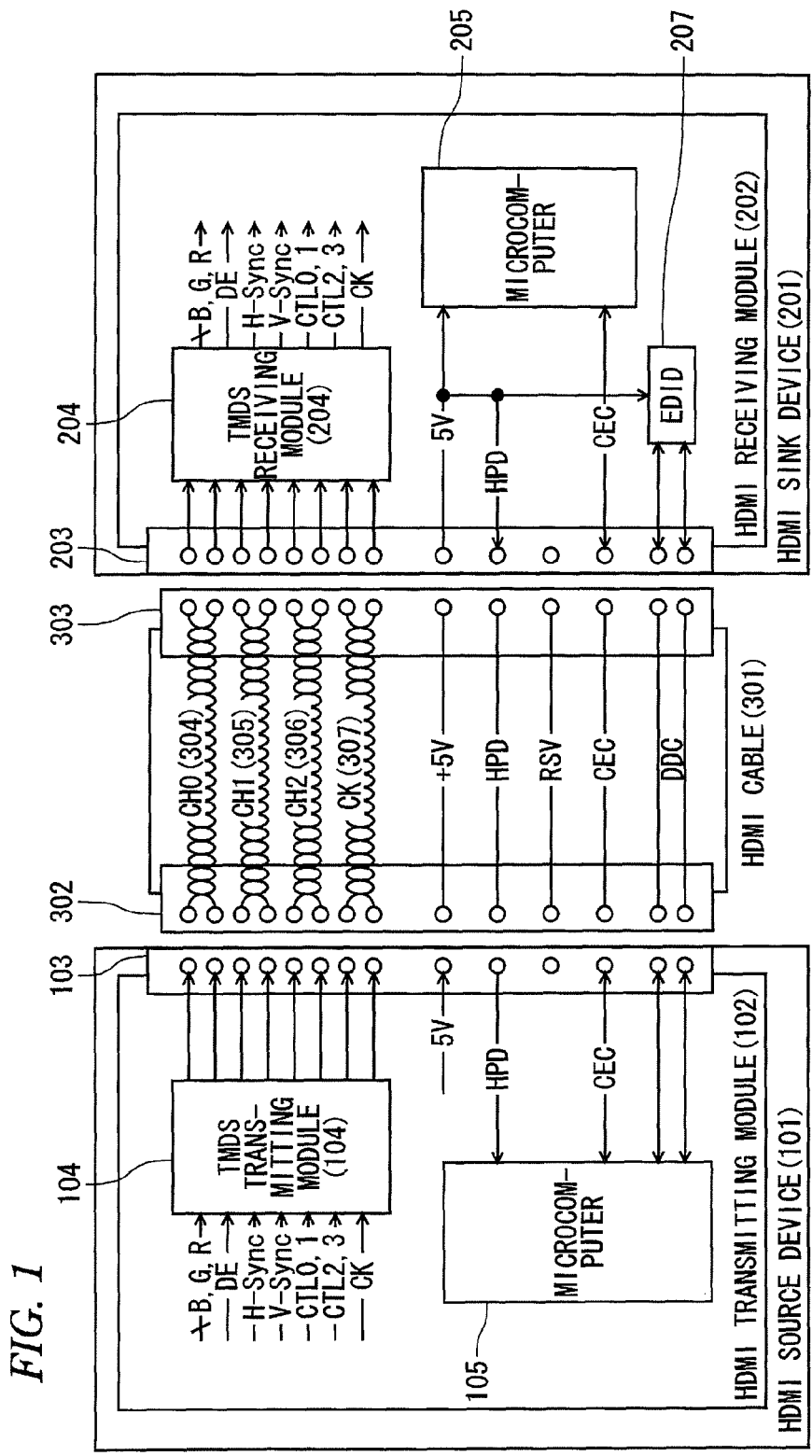
FIG. 1 is a view for illustrating an example of a configuration of an HDMI system according to an embodiment of the present invention.

FIG. 1 illustrates an overview of an exemplary configuration of the HDMI system according to an embodiment of the present invention. Further, the configuration overview of FIG. 1 is similar to that of a conventional HDMI system. Also, the same HDMI system as the conventional HDMI system is also utilized in the embodiment.

In the HDMI system of FIG. 1, an HDMI source device 101, for example, a DVD player, and an HDMI sink device 201, for example, a TV receiver, are connected with each other through a HDMI cable 301.

The HDMI source device 101 is composed of an HDMI transmitting module 102, an HDMI terminal 103, a TMDS transmitting module 104 and a microcomputer 105. The HDMI terminal 103 contains a plurality of terminals, and each of which is connected to each of the transmission lines of the HDMI cable 301.

The microcomputer 105 has functions of detecting the connection of HDMI sink device 201 with the HDMI cable 301 through the voltage variation of HPD (Hot Plug Detect) signal line within the HDMI cable 301, of reading-out data from an EDID memory 207 of the HDMI sink device 201 using the DDC (Display Data Channel) line of the HDMI cable 301, and of communicating using a CEC (Consumer Electronics Control) line of the HDMI cable 301.

The HDMI sink device 201 includes an HDMI receiving module 202, an HDMI terminal 203, a TMDS receiving module 204, a microcomputer 205 and an EDID memory 207 having encoded and stored a display characteristic capability of the HDMI sink device therein.

The microcomputer 205 has functions of detecting a state, at which the HDMI source device 101 is connected with the HDMI cable 301 and activated by being supplied with electrical power, through 5V line of the HDMI cable 301, and function of communicating using CEC line of the HDMI cable 301.

Figure 2:
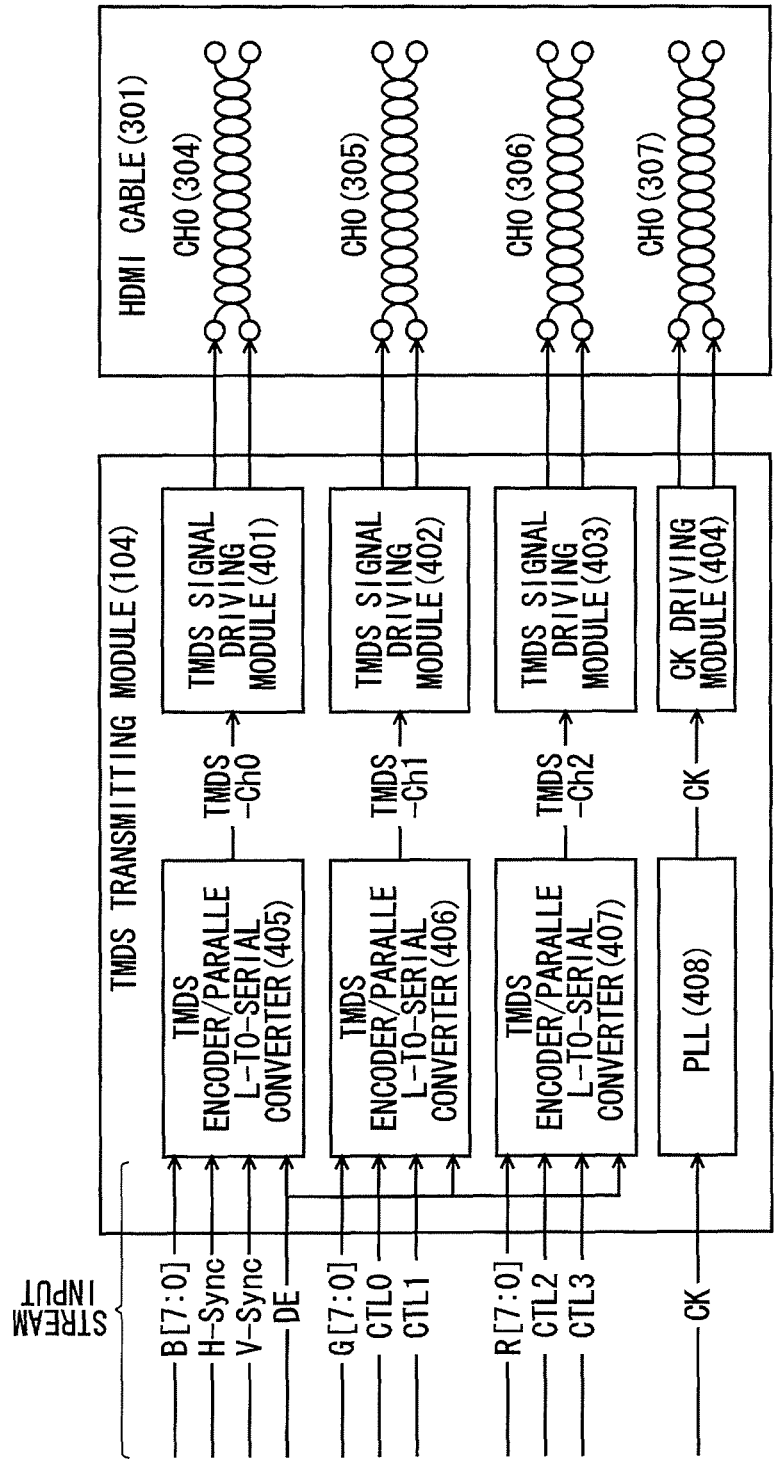
FIG. 2 is a view for illustrating an example of a configuration of a TMDS transmitting module of an HDMI source device according to the embodiment.

FIG. 2 is a block diagram illustrating an example of a configuration of the TMDS transmitting module 104.

The TMDS transmitting module 104 is composed of TMDS signal driving modules 401, 402 and 403, a CK driving module 404, TMDS encoder/parallel-to-serial converters 405, 406 and 407, and PLL (Phase Locked Loop) 408. The TMDS transmitting module 104 corresponds to a TMDS transmitter 1 depicted in FIG. 1 of Japanese Patent Application Laid-Open Publication No. 2005-514873. The TMDS encoder/parallel-to-serial converters 405, 406 and 407 correspond to encoder/parallel-to-serial converters 2, 4 and 6 depicted in FIG. 1 of Japanese Patent Application Laid-Open No. 2005-514873. Additionally, the TMDS signal driving modules 401, 402 and 403, a CK driving module 404, and PLL 408 are depicted in FIG. 2 of the embodiment of the present invention. A portion of the HDMI cable is also depicted in FIG. 2 enabling easy to understand an overview of the TMDS transmitting module.

In the HDMI specification, each 8-bit data of the three-color components (B[7:0]), G[7:0], R[7:0]) of pixels of an image signal to be transmitted is converted into (TMDS encoded) 10-bit data, respectively, by the TMDS encoder/parallel-to-serial converters 405, 406 and 407 to be converted into a serial data. This encoding scheme is referred to as Transition Minimized Differential Signal (TMDS). Each of the three-color components (R, G, B) of pixels of the image signal converted into the serial data is input to each of TMDS signal driving modules 401, 402 and 403 as TMDS-Ch0, TMDS-Ch1 and TMDS-Ch2, respectively. The TMDS signal driving modules 401, 402 and 403 generate differential signals based on the input bit serial data and output the differential signals to the transmission lines of the each channel (drive the transmission line of the each channel).

An blanking signal (containing Horizontal synchronization signal (H-Sync) and Vertical synchronization signal (V-Sync)) along with each of the control signals CTL0, CTL1, CTL2 and CTL3 composes the image signal. When the image signal is transmitted, the blanking signal or the respective control signals and the pixel signals (B[7:0], G[7:0], R[7:0]) are discriminated by a data enable (DE) signal. That is, as illustrated in FIG. 6 described below, in the case where the blanking signal and various control signals have been transmitted when the DE signal becomes 0, and in the case where the pixel signal has been transmitted when the DE signal becomes 1.

Herein, 2-bit of H-Sync and V-Sync is converted into 10-bit serial data by the TMDS encoder/parallel-to-serial converter 405 and becomes the differential signal at the TMDS signal driving module 401 to drive the Ch0 transmission line 304. 2-bit of CTL0 and CTL1 is converted into 10-bit serial data by the TMDS encoder/parallel-to-serial converter 406 and becomes the differential signal at the TMDS signal driving module 402 to drive the Ch1 transmission line 305. Further, 2-bit CTL2 and CTL3 is converted into 10-bit serial data by the TMDS encoder/parallel-to-serial converter 407 and becomes differential signal at TMDS signal driving module 403 to drive the Ch2 transmission line 306.

Figure 3:
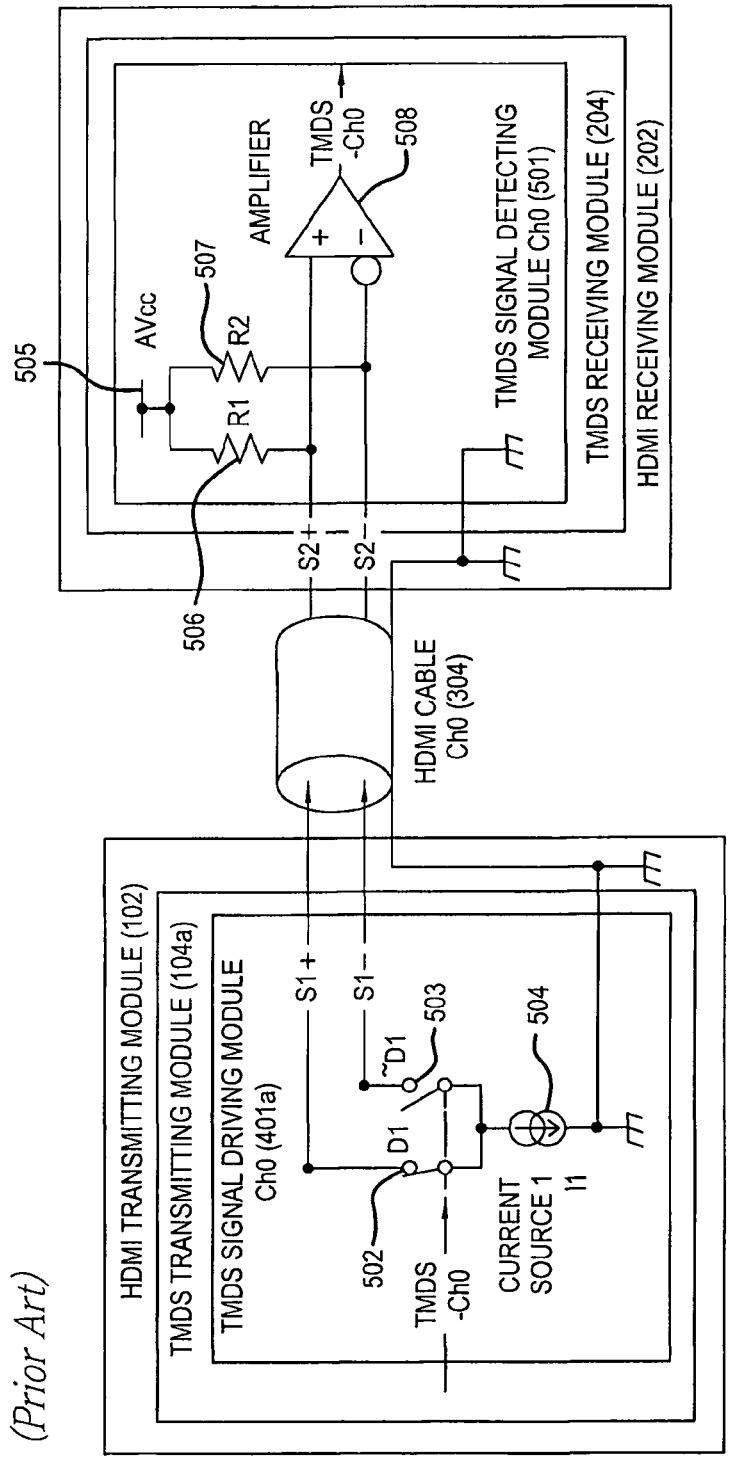
FIG. 3 is a view for illustrating an aspect of the conventional HDMI.

FIG. 3 is a view illustrating an example of a conventional HDMI connection aspect. In the conventional HDMI system, a TMDS transmitting module 104a and a TMDS receiving module 204 are DC-coupled through the HDMI cable. The TMDS transmitting module 104a contains a TMDS signal driving modules 401a. The TMDS transmitting module 104a corresponds to the TMDS transmitting module 104 according to the embodiment and the TMDS signal driving module 401a is a module corresponding to the TMDS signal driving module 401. However, details of the configuration of the TMDS transmitting module 104a is different from that of the TMDS transmitting module 104, and further, details of the configuration of the TMDS signal driving module 401a is different from that of the TMDS signal driving module 401.

The TMDS signal driving module 401a contained in the TMDS transmitting module 104a is coupled to a TMDS signal detecting module 501 contained in the TMDS receiving module 204 illustrated in FIG. 1 through the Ch0 transmission line 304 of the HDMI cable 301.

Further, the configurations of the TMDS signal driving modules connected to other transmission lines (Ch1 transmission line (305), Ch2 transmission line (306), Ch3 transmission line (307)) are similar to that of the TMDS signal driving module 401a, and the descriptions thereof will be omitted. Also, the descriptions regarding FIGS. 4 to 13 will be made based on the Ch0 transmission line 304 and a module according to the Ch0 transmission line 304, however, the descriptions of the Ch0 transmission line 304 and the module are the same as those in other transmission lines and modules according to the transmission lines.

The TMDS signal driving module 401a contains a switch 502, switch 503 and a current source 504. The switch 502 switches ON and OFF the connection of the current source 504 with the transmission line 304, and the switch 503 switches ON and OFF the connection of the current source 504 with the transmission line 304. The switch 102 and the switch 103 are operated mutually in an invert phase. The TMDS signal driving module 401a switches ON and OFF of the switches 502 and 503 in accordance with an input signal logic of the TMDS-Ch0 signal of bit serial data input from the TMDS encoder/parallel-to-serial converter 405. The current source current I1 alternately turned ON/OFF in accordance with the input logic of the TMDS-Ch0 signal of the bit serial data is transmitted to the TMDS signal detecting module 501 of the TMDS receiving module 204 of the HDMI receiving module 202 through the Ch0 transmission line 304 of the HDMI cable 301. In other words, the current source 504 is connected to the differential inputs of a resistor 506, a resistor 507, and an amplifier 508 through the Ch0 transmission line 304.

By doing this, the bit serial data of the TMDS-Ch0 signal of the TMDS transmitting module 104 is detected by an amplifier 508 of the TMDS signal detecting module 501 of the TMDS receiving module 204. That is, the bit serial data of the TMDS-Ch0 signal input to the TMDS signal driving module 401a is transmitted to the TMDS receiving module 204 as the bit serial data of the TMDS-Ch0 signal output from the amplifier 508.

Further, the voltage AVcc 505 of the HDMI receiving module 202 has been applied to the terminals of the S1+ signal and S1− signal output from the TMDS signal driving module 401a. The voltage of the AVcc 505 is set to 3.3 V according to the interface standards. The TMDS transmitting module 104a is implemented by an integrated circuit, but since the withstand voltage characteristics corresponding to the voltage of 3.3 V, a large scale integrated circuit which does not satisfy the withstand voltage characteristics cannot be employed in the conventional TMDS signal driving module.

Figure 4:
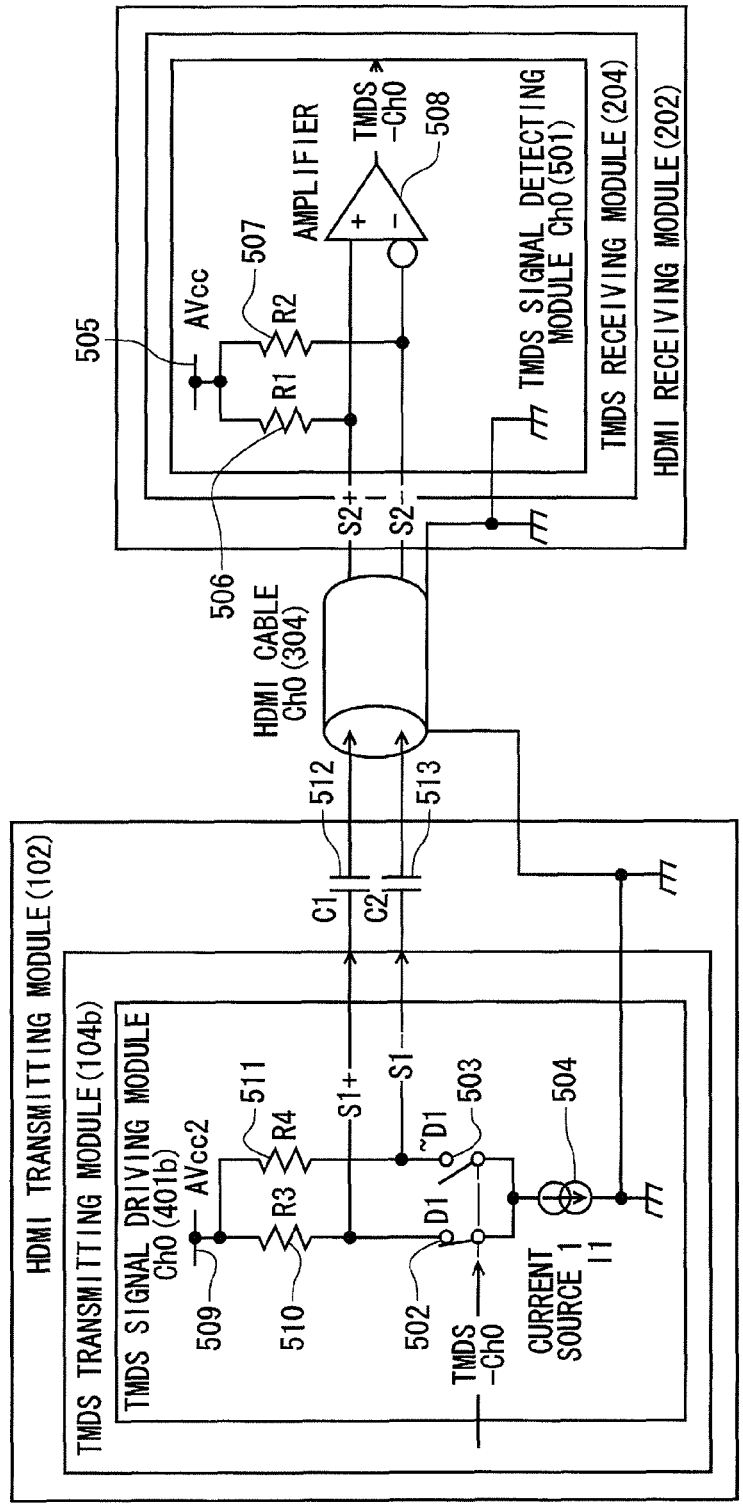
FIG. 4 is a view for illustrating an aspect of an HDMI in the case where the HDMI source device and an HDMI sink device are AC-coupled.

FIG. 4 is a view illustrating an example of the HDMI system aspect in the case where the HDMI source device and the HDMI sink device are AC-coupled. Furthermore, the configuration of the HDMI system illustrated in FIG. 4 is different from that of the conventional HDMI, unlike the HDMI system illustrated in FIG. 3. In the HDMI system illustrated in FIG. 4, a TMDS transmitting module 104b and a TMDS receiving module 204 are AC-coupled through the HDMI cable. The TMDS transmitting module 104b contains a TMDS signal driving module 401b. The TMDS transmitting module 104b corresponds to the TMDS transmitting modules 104 illustrated in FIGS. 1 and 2, and the TMDS signal driving module 401b is a module corresponding to the TMDS signal driving module 401 of FIGS. 1 and 2. However, details of the configurations of the TMDS transmitting module 104b and the TMDS signal driving modules 401b are different from those of the TMDS transmitting module 104 and the TMDS signal driving modules 401, respectively. Furthermore, the components illustrated in FIG. 4 to which the same reference numerals as those of FIG. 3 are given have the same functions as those described in the description of FIG. 3.

The TMDS transmitting module 104b of FIG. 4 is AC-coupled with the TMDS receiving module 204 by inserted of the capacitors 512 and 513 to the connection path between the Ch0 transmission line 304 and the TMDS transmitting module 104b, in addition to the respective components of the TMDS transmitting module 104a in FIG. 3. Further, the capacitors 512 and 513 are installed outside the TMDS transmitting module 104b, but, the positions of the capacitors 512 and 513 are not limited thereto and, for example, may be installed inside the TMDS transmitting module 104b or the TMDS signal driving module 401b. That is, the capacitors 512 and 513 may be installed at any position between the TMDS signal detecting module 501 and the TMDS signal driving module 401b that are not composed of DC-coupled (AC-coupled).

The TMDS signal driving module 401b of FIG. 4 is additionally provided with a power source AVcc2 509, a pull up resistor 510, a pull up resistor 511 and a circuit connected to the power source AVcc2 509 through the pull up resistors 510 and 511, in addition to the respective components of the TMDS signal driving module 401a of FIG. 3. Since the voltage of the AVcc2 509 can determined independently of the AVcc 505, when the voltage of the AVcc2 509 is set to a low voltage, it is possible to utilize a large-scale integrated circuit being adopted a micro-lithography to TMDS signal driving module which has capable of higher speed operation and larger scale integrated circuit.

However, the ratio of the number of logic 1 (one) to the number of logic 0 (zero) among the serial data of 10-bit is not a ratio of 5:5, so that a DC unbalance between the S2+ signal and S2− signal occurs in the differential transmission lines of the HDMI receiving module 202 side after passing through the capacitors 512 or 513 and deteriorates the transmission characteristics. This deterioration will be described with reference to FIGS. 5 to 7.

Figure 5:
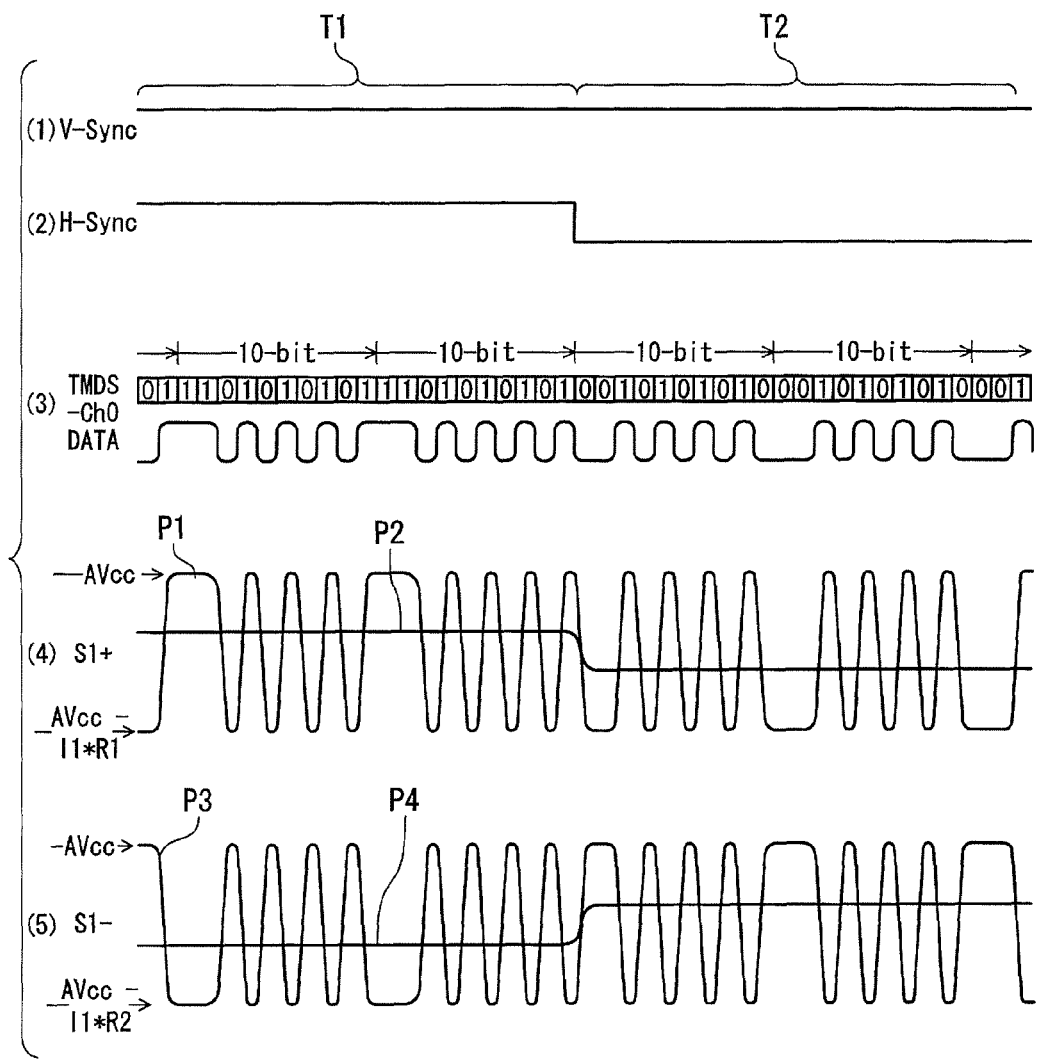
FIG. 5 is a view for illustrating examples of timing charts of a TMDS signal driving module of the HDMI source device.

FIG. 5 is a view illustrating examples of TMDS-Ch0 data which is the serial input signal to the TMDS signal driving modules 401, 401a and 401b, and the waveforms examples of the signals S1+ and S1− output from the TMDS signal driving modules 401a and 401b before and after the H-Sync signal transmitted in a blanking period of the image signal varies. Further, DE is at L level in a period during which the H-Sync signal having been input, but, the description thereof will be omitted. The waveform examples of the signals S1+ and S1− output from the TMDS signal driving modules 401 will be described in conjunction with the description of FIGS. 12 and 13.

V-Sync illustrated in FIG. 5, (1) is a vertical synchronization signal of the image signal, and H-Sync illustrated in FIG. 5, (2) is a horizontal synchronization signal of the image signal. These signals are input to the TMDS encoder/parallel-to-serial converter 405 as input signals to the TMDS transmitting modules 104, 104a and 104b.

FIG. 5, (3) illustrates the TMDS-Ch0 data of the bit serial data, a range of a module of 10-bit code and a logic value of each bit and 1-bit waveform. The waveform output from the TMDS encoder/parallel-to-serial converter 405 becomes a waveform pursuant to the TMDS-Ch0 data. This waveform data is input to the TMDS signal driving modules 401, 401a and 401b. Further, the value of the each bit of the TMDS-Ch0 data is determined by a table of FIG. 6B which will be described in below.

That is, since the V-Sync=H as well as the H-Sync=H during a period of T1 illustrated in FIG. 5, the state of the transmission path state becomes state 3 illustrated in FIG. 6B, and the 10-bit code becomes 1101010101. Similarly, the V-Sync=H and H-Sync=L during a period of T2 illustrated in FIG. 5, the state of transmission path becomes state 2 illustrated in FIG. 6B, and the 10-bit code becomes 0010101010.

The waveform P1 illustrated in FIG. 5, (4) represents a waveform of S1+ signal output from the TMDS signal driving modules 401a and 401b, and the waveform P2 represents a waveform of DC component (low frequency component) of S1+ signal. The waveform P3 illustrated in FIG. 5, (5) represents a waveform of S1− signal output from the TMDS signal driving modules 401a and 401b, and the waveform P4 represents a waveform of DC component of S1− signal.

When the switch 502 is turned OFF, the TMDS-Ch0 data becomes H level of the logic value 1, and in this case, a level of the output driving data S1+ represents potential of the AVcc 505 included in the TMDS signal detecting module 501 of FIG. 3. When the switch 502 is turned ON, the TMDS-Ch0 data becomes L level corresponding to logic 0, and in this case, the level of the output driving data S1+ becomes approximately potential of the AVcc−R1*I1. Further, since the ratio of the number of logic 1 to the number of logic 0 per 10-bit varies from 6:4 to 4:6 as a period varies from T1 to T2, an average level of the output driving data S1+ becomes "AVcc−((AVcc−R1*I1)*6/10)" during H-Sync=H and "AVcc−((AVcc−R1*I1)*4/10)" during H-Sync=L. The average level is illustrated in FIG. 5, (4) as a DC component.

FIG. 6A illustrates a corresponding relationship between each transmitting channel of Ch0 to Ch2 and the input and output signals of the TMDS encoder/parallel-to-serial converters. FIG. 6B illustrates a corresponding relationship between signals regarding Ch0 to Ch2 transmission lines and the encoded values when the signals have been encoded by the TMDS encoder/parallel-to-serial converters (signals (10-bit serial signals) output from the TMDS encoder/parallel-to-serial converters). When V-Sync=H as well as H-Sync=H, the TMDS-Ch0 data is 1101010101 corresponding to the 10-bit code in state 3 of FIG. 6B. Further, when V-Sync=H and H-Sync=L, the TMDS-Ch0 data is 0010101010 corresponding to the 10-bit code in state 2 of FIG. 6B. In the case where V-Sync=H, since the serial data can be obtained from the 10-bit codes for the case where the value of the H-Sync is varied from High (H) to Low (L) or from Low to High, it is possible to draw the TMDS-Ch0 data or the output driving data S1+ and S1− as depicted in FIG. 5.

Figure 7:
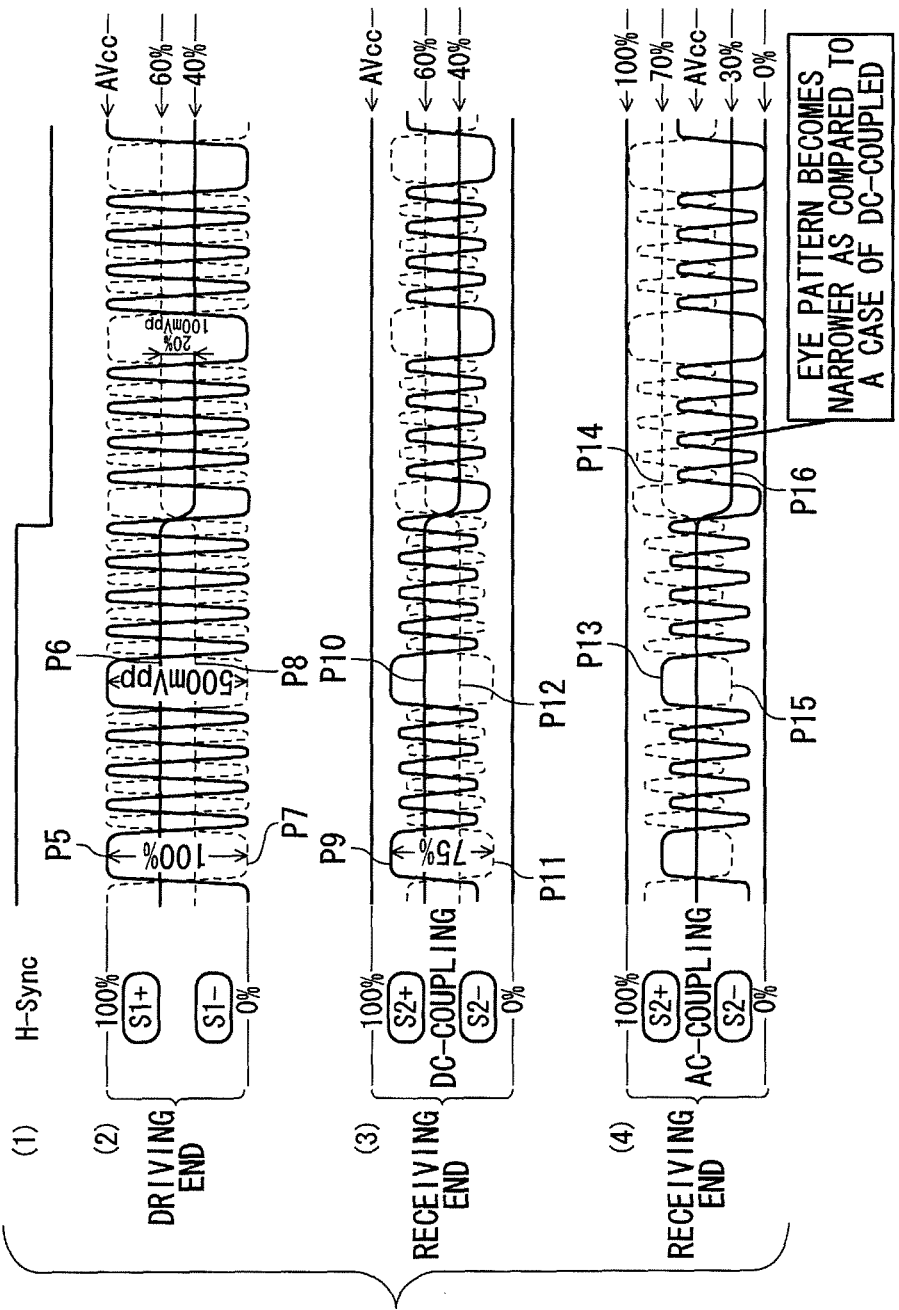
FIG. 7 is a view for illustrating examples of timing charts of differential signal levels in the HDMI source device and the HDMI sink device illustrated in FIGS. 3 and 4.

FIG. 7, (1) illustrates a level of the H-Sync signal. In FIG. 7, (1), the H-Sync being in H level corresponds to the state 3 in FIG. 6B and the H-Sync being in L level corresponds to the state 2 in FIG. 6B. FIG. 7, (2) illustrates a waveform of the S1+ signal as the waveforms at a driving terminal, a waveform of DC component of the S1+ signal, a waveform of the S1− signal, and a waveform of DC component of the S1− signal. Further, the waveform P5 of the S1+ signal and the waveform P6 of DC component of the S1+ signal are depicted as a solid line, and the waveform P7 of the S1− signal and the waveform P8 of DC component of the S1− signal are depicted as a dotted line. These driving terminal waveforms are, for example, waveforms at the TMDS signal driving modules 401a and 401b.

The ratio of the DC component levels of the S1+ signal waveform and the S1− signal waveform at the driving terminal against to the 100% level of the S1+ signal and the S1− signal to be transmitted are four-tenths (40%) and six-tenths (60%), respectively, that is, shifted to level of ±10% based on the 50% level corresponding to a common voltage of the differential signal, respectively.

FIG. 7, (3) illustrates a waveform at a receiving terminal when the transmitting side and the receiving side are DC-coupled, that is, for example, illustrates a receiving terminal waveform at the TMDS signal detecting module 501 illustrated in FIG. 3. Here, FIG. 7, (3) illustrates a waveform of the S2+ signal as the waveforms at a receiving terminal, a waveform of DC component of the S2+ signal, a waveform of the S2− signal, and a waveform of DC component of the S2− signal. Further, the waveform P9 of the S2+ signal and the waveform P10 of DC component of the S2+ signal are depicted as a solid line, and the waveform P11 of the S2− signal and the waveform P12 of DC component of the S2− signal are depicted as a dotted line.

In the case of DC-coupled, the signal waveform at the receiving terminal will be described. Since the DC component at the receiving end is a low frequency component good for a signal transmission characteristic of the cable, amplitude of the DC component is the same as that of the transmitting end. Meantime, the high frequency components of the S2+ signal and S2− signal are deteriorated depending on the signal transmission characteristic of the cable and the amplitudes thereof become smaller. Here, the high frequency components are put reduced to 60% in a level where logic 1 is continued with three times.

FIG. 7, (4) illustrates a waveform at a receiving terminal for the case where the transmitting side and the receiving side are AC-coupled, that is, for example, a receiving terminal waveform at the TMDS signal detecting module 501 in FIG. 4. Here, FIG. 7, (4) illustrates a waveform of the S2+ signal as the waveforms at a receiving terminal, a waveform of DC component of the S2+ signal, a waveform of the S2− signal, and a waveform of DC component of the S2− signal. Further, the waveform P13 of S2− signal and the waveform P16 of DC component of the S2− signal are depicted as a solid line, and the waveform P15 of the S2+ signal and the waveform P14 of DC component of the S2+ signal are depicted as a dotted line.

For the case where being AC-coupled, the signal waveform at the receiving terminal will be described. When AC-coupled, the levels of the DC components of the S2+ signal and S2− signal are converged to a voltage level of the pull-up voltage AVcc 505 in FIG. 4 by a capacitor utilized in the AC-coupling. Further, in FIG. 7, (4), the convergence level of the DC components is represented as 50% level, and a state of the convergence level in a period during which the H-Sync is in H level is illustrated. The DC component of the S1+ signal of which level at the driving terminal was 60% becomes 50% level as the DC component of the S2+ signal at the receiving terminal, and the DC component of the S1− signal of which level at the driving terminal was 40% becomes 50% level as the DC component of the S2− signal at the receiving terminal, so that the DC components of the S2+ signal and S2− signal become equal to each other.

In FIG. 7, (4), right after the H-Sync is varied from High state to Low state, the DC component also varies, and the S2− signal increases from a level of 50% by an varying amount of 20% and the S2+ signal decreases from a level of 50% by a varying amount of 20%, so that the S2− signal and the S2+ signal becomes 70% level and 30% level, respectively. The increased amount and the decreased amount of which converging time is determined by the value of the capacitor or the pull up resistor value are eventually converged to the pull up voltage AVcc 505 (as the 50% level).

During a period under transition state before being converged to the pull up voltage, a differential input to a differential amplifier 508 becomes small (eye pattern becomes narrower) as compared to the case of DC-coupled, so that a signal may not be detected. That is, during an AC-coupled state, when the DC component included in the signal varies, the signal may not be able to be detected as compared to the case of DC-coupled. Otherwise, a detection error rate increases. Further, the DC component varies when a state is changed from state 0 or state 1 to state 2 or state 3, from state 2 or state 3 to state 0 or state 1, from state 2 to state 3, or from state 3 to state 2, in FIG. 6(B). In other words, in the case where a 10-bit code input to the TMDS signal driving module is changed, when a ratio of the number of logic 1 and the number of logic 0 is not 5:5 in the 10-bit code of either one of before or after the 10-bit code is changed, the DC component is changed.

As described above, in the case where the bit serial signals input to the TMDS signal driving module includes a bit serial signal whose ratio of the number of logic 1 to the number of logic 0 per 10-bit is not 5:5, when the differential signal based on the bit serial signal is transmitted to the transmission path by the AC-coupling method, the respective midpoint levels of the differential signals are varied in transient at a time when the DC component contained in the differential signal itself is changed. Accordingly, the TMDS signal detecting module 501 at the receiving side becomes unable to normally detect the differential signals as compared to the case where the transmitting side and the receiving side are DC-coupled, or the detection error rate increases.

Accordingly, in the case where a ratio of the number of logic 1 to the number of logic 0 of the encoded bit serial input signal is not 5:5, when transmitting the encoded bit serial input to the digital signal transmission line as the differential signal, the TMDS signal driving module 401 compensates the waveforms of the signal so that the DC component of the bit serial differential signal to be transmitted becomes a constant level.

As illustrated in FIGS. 6(A) and 6(B), the ratio of the number of logic 1 to the number of logic 0 of the encoded 10-bit code itself is definite, and the DC component contained in the serial data signal becomes a constant ratio to the amplitude of the serial data signal. Therefore, the DC level of the signal to be transmitted is compensated so that the change in DC component of the serial data signal is not occurred in the TMDS signal driving module 401.

FIG. 8 illustrates a compensation level by the TMDS signal driving module 401. The TMDS signal driving module 401 reduces the DC component level by 10% when the level is 50%, the DC component level by 20% when the level is 60% and does not correct the DC component level (the correction amount is 0%) when the level is 40%, such that DC component levels of the S1+ and S1− signals after compensation becomes 40% of a predetermined value. Where, the DC component level of 100% is a wave height value of the waveform of the 10-bit serial output signal, and a current value I1 of the current source 1 of the driving circuit in FIG. 4.

Figure 9:
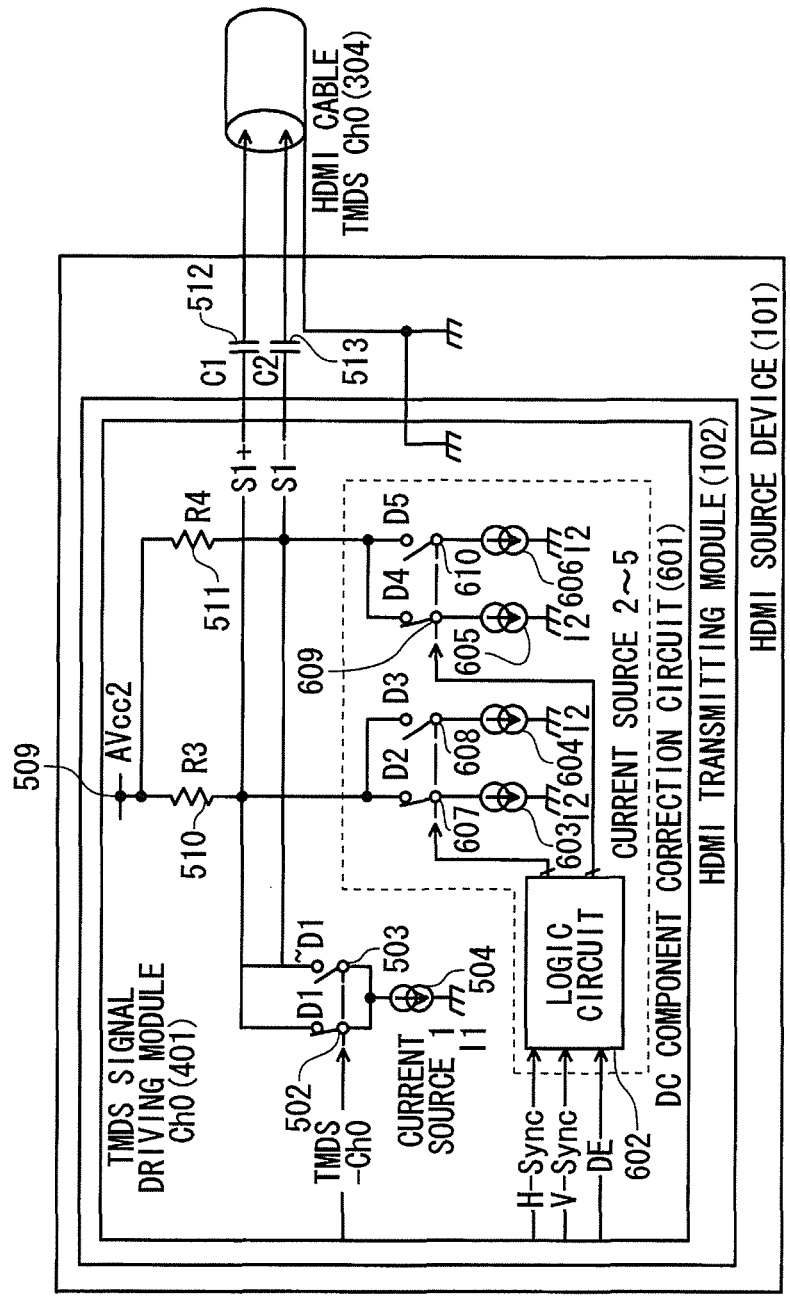
FIG. 9 is a view for illustrating an example of the compensation circuit configuration of the HDMI transmitting module of the HDMI source device according to the embodiment.

FIG. 9 illustrates an example of a circuit configuration of the TMDS signal driving module 401 according to the embodiment. Further, the functions of the components given to like reference numerals are the same as those described in the FIGS. 3 and 4.

The TMDS signal driving module 401 has a DC component correction circuit 601 in addition to the respective components included in the TMDS signal driving module 401b illustrated in FIG. 4. Herein, the H-sync, V-sync and the DE input to the TMDS transmitting module 104 are input to the DC component compensation circuit 601. The DC component compensation circuit 601 switches the current to be corrected based on the signal inputted thereto. Further, the control signals are input and the DC component compensation circuits are added to the TMDS signal driving modules 402 and 403 as well, but, the description thereof is omitted. In FIG. 9, though the HDMI sink device 201 is not illustrated, the HDMI source device 101 is also connected to the HDMI sink device 201.

The DC component compensation circuit 601 contains a logic circuit 602, a current source 603, a current source 604, a current source 605 and a current source 606, and a switch 607, a switch 608, a switch 609 and a switch 610 which are switching ON and OFF the currents from these current sources, respectively. The logic circuit 602 switches the currents of the current sources in accordance with the input logic as illustrated in FIG. 8 depending on the input control signals (H-Sync, V-Sync and DE).

The current value I2 of each of the current source 603, current source 604, current source 605 and a current source 606 is 10% (one-tenth) of a current value I1 of the current source 504.

The current values switched by the switches 607 and 608 are combined to be added to an amount of the current switched ON/OFF by the switch 502, the resultant current is converted into a voltage by a resistor 510 and the voltage drives a positive (+) terminal of the Ch0 transmission line 304 of the HDMI cable through the capacitor 512. Further, the current values switched by the switches 609 and 610 are combined to be added to a current amount of the current source 504 switched ON/OFF by the switch 503, the resultant current is converted into a voltage by the resistor 511 and the voltage drives the negative (−) terminal of the Ch0 transmission line 304 of the HDMI cable through the capacitor 513.

Figure 10:
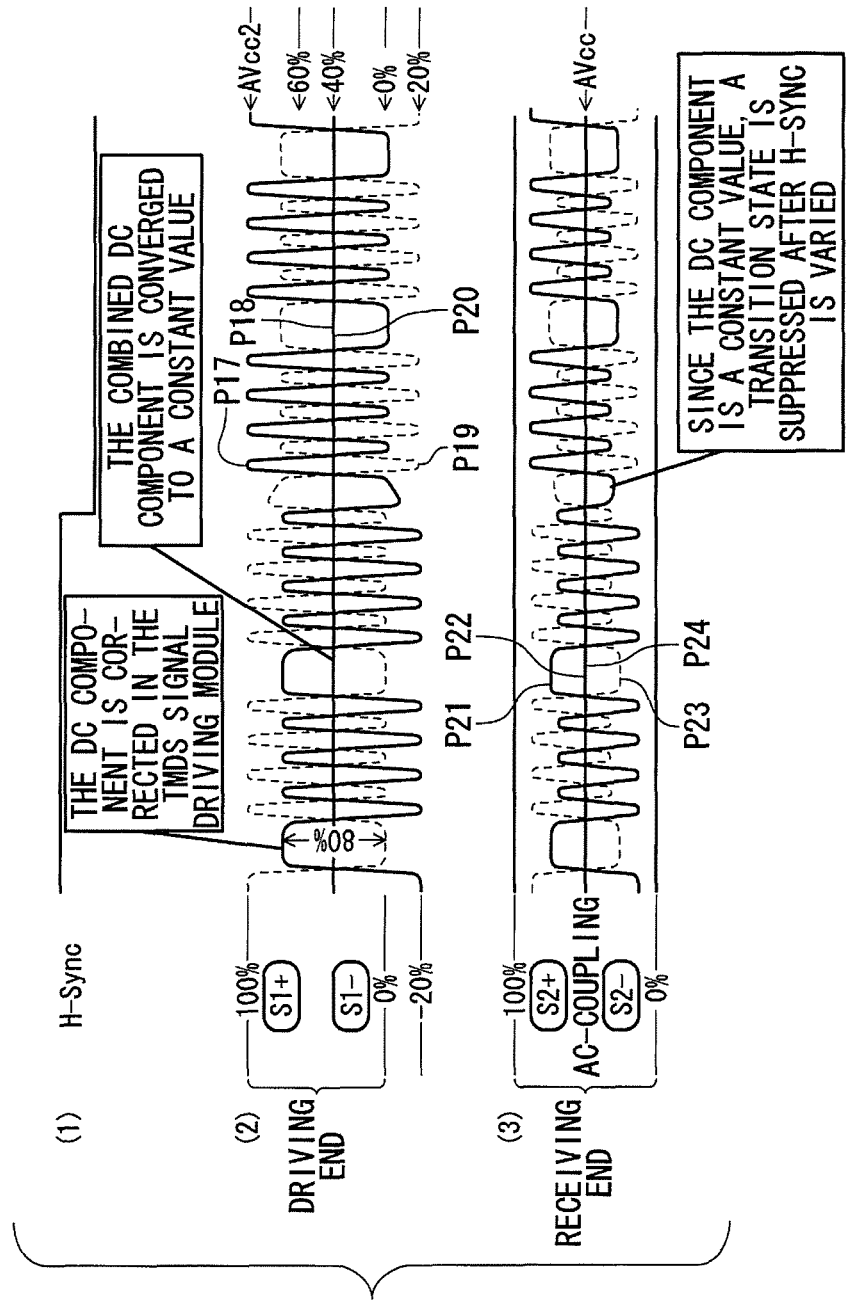
FIG. 10 is a view for illustrating examples of timing charts of differential signal levels in the HDMI source device and HDMI sink device according to the embodiment.

FIG. 10 illustrates signal waveforms at the driving terminal and at the receiving terminal when the DC components are compensated at the TMDS signal driving module 401 as described in FIG. 9. Here, FIG. 10(1) represents a level of the H-sync. FIG. 10(2) represents the bit serial signal waveforms of the S1+ and S1− signals at the driving terminal of the HDMI cable and the waveforms of the DC components of the S1+ and S1− signals. Further, the waveform P17 of the S1+ signal and the waveform P18 of the DC component of the S1+ signal are represented by a solid line, and the waveform P19 of the S1− signal and the waveform P20 the DC component of the S1− signal are represented by a dotted line.

The DC component compensation circuit 601 reduces the S1+ level of which the DC component level was 60% in FIG. 7, (2) by 20% to become 40% in a period during which the H-Sync is in H. Further, the DC component compensation circuit 601 maintains the S1− level of which DC component level was 40% in FIG. 7, (2) at 40% without compensating the S1− level in the period during which the H-Sync is in H.

When a period during which the H-Sync is L comes, the DC component compensation circuit 601 maintains the S1+ level of which the DC component level was 40% in FIG. 7, (2) at 40% without compensating the S1+ level. Further, when the period during which the H-Sync is L comes, the DC component correction circuit 601 performs a compensation to reduce the S1− level of which the DC component level was 60% in FIG. 7, (2) by 20% to become 40%. By doing this, the DC component compensation circuit 601 maintains the DC component level to a level of 40% at all the periods.

FIG. 10(3) illustrates examples of the signal waveforms at the receiving terminal in the case where the correction described above is performed. Further, the waveform P21 of the S2+ and the waveform P22 of the DC component of the S1+ are represented by a solid line, and the waveform P23 of the S2− and the waveform P24 of the DC component of the S1− are represented by a dotted line. Since the DC component levels of the S1+ and S1− at the driving terminal are always constant, the bit serial signals of the S2+ and S2− at the receiving terminal do not vary, and a deterioration degree thereof is small as compared with the case where the compensation of the DC component is not performed for the AC-coupling as illustrated in FIG. 7, (4).

Figure 11:
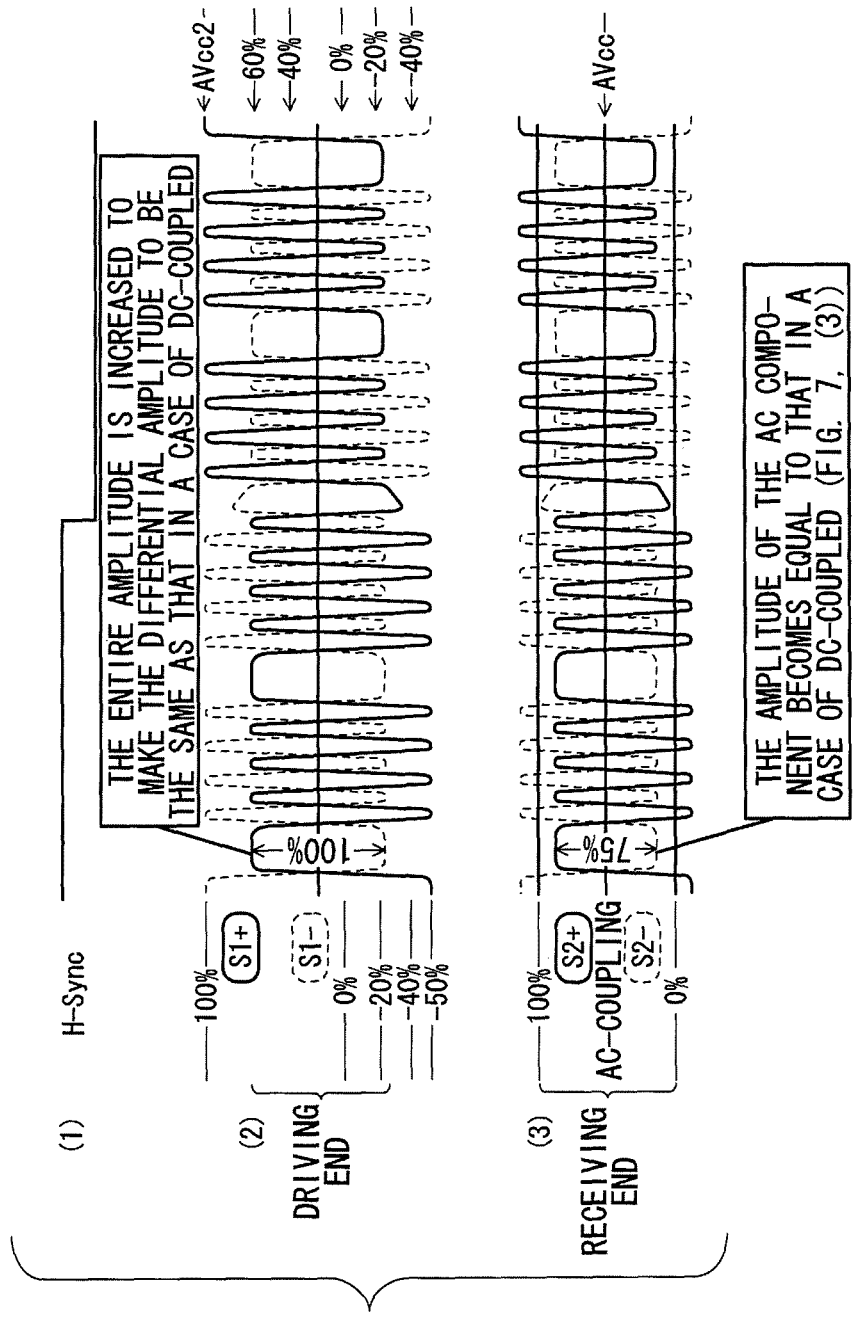
FIG. 11 is a view for illustrating examples of compensating waveform in the HDMI source device according to the embodiment.

FIG. 11 is a view illustrating examples of timing charts in the case where a compensation is performed so that amplitude of the entire bit serial signal waveform becomes larger, in addition to the operations performed for the DC component correction in FIG. 10. In FIG. 10, the amplitude of the AC component is 100%. However, since the DC level shifting down by 20% is performed on the AC component (high frequency component) of the S1+ signal, the amplitudes of the differential signals of the S1+ signal and S1− signal have resulted in 80% of the original signal amplitude (amplitude illustrated in FIG. 7, (2)). In order to make the differential signal amplitude of 80% to be the differential signal amplitude of 100%, the TMDS signal driving modules 401 performs a correction to increase the entire amplitude to 125%. That is, the TMDS signal driving modules 401 performs the DC level shifting down by 20% on the AC component of the S1+ signal which represents 100% level in a period during which the H-Sync=H in FIG. 7, (2) to obtain the differential amplitude of 80% as in FIG. 10(2). In order to make the differential signal amplitude of 80% to be increased to a differential signal amplitude of 100%, the TMDS signal driving modules 401 performs a correction on both the S1+ signal and S1− signal to make the amplitudes of the AC components of the S1+ signal and S1− signal to 1.25-fold as large as those of the original S1+ and S1− signals.

In order to perform a 1.25-fold amplification of the AC components described above, the current value I1 of the current source 504 in FIG. 9 is set to a value of 1.25-fold as large as that when being DC-coupled. Accordingly, the current values I2 of the current source 603, the current source 604, the current source 605 and the current source 606 also varies to a value of 1.25-fold as large as those when being DC-coupled, but, the setting of I2 to 10% (one-tenth) of the current value I1 is not varied.

With the amplification described above, the input differential amplitude at the receiving terminal illustrated in FIG. 11(3) becomes 75%, and the same amount as that in the receiving terminal when being DC-coupled as in FIG. 7, (3) can be obtained. Strictly speaking, in the above-described example, the level becomes equivalent to those of FIG. 7, but the waveforms are different from those of FIG. 7. Since the received signal level depends on the characteristics of a cable serving as the signal transmission path, a much more accurate compensation amount is obtained by performing, first of all, increasing and correcting the amplitude to a minimum value of the transmission characteristics defined by a standard as a target value and then, the DC-shifting with a predetermined amount as an alternative for amplifying the amplitude. In the actual devices, since various compensation processing (e.g., waveform equalization) for the received signals are performed at the sink apparatus side, the matters illustrated in FIG. 11(2) are sufficient for the compensation to be performed at the transmitting side.

Figure 12:
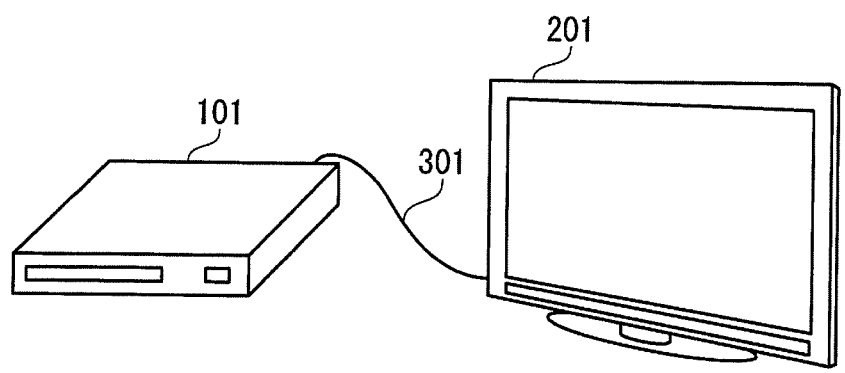
FIG. 12 is a view for illustrating an example of use-case of the HDMI source device according to the embodiment.

FIG. 12 is a view illustrating a use-case example of the HDMI source device 101 and the HDMI sync device 201 according to the embodiment.

Here, the HDMI source device 101 is realized by, such as for example, a set top box or DVD player, while the HDMI sink device 201 is realized by, for example, TV or a monitor having, for example, a tuner.

Figure 13:
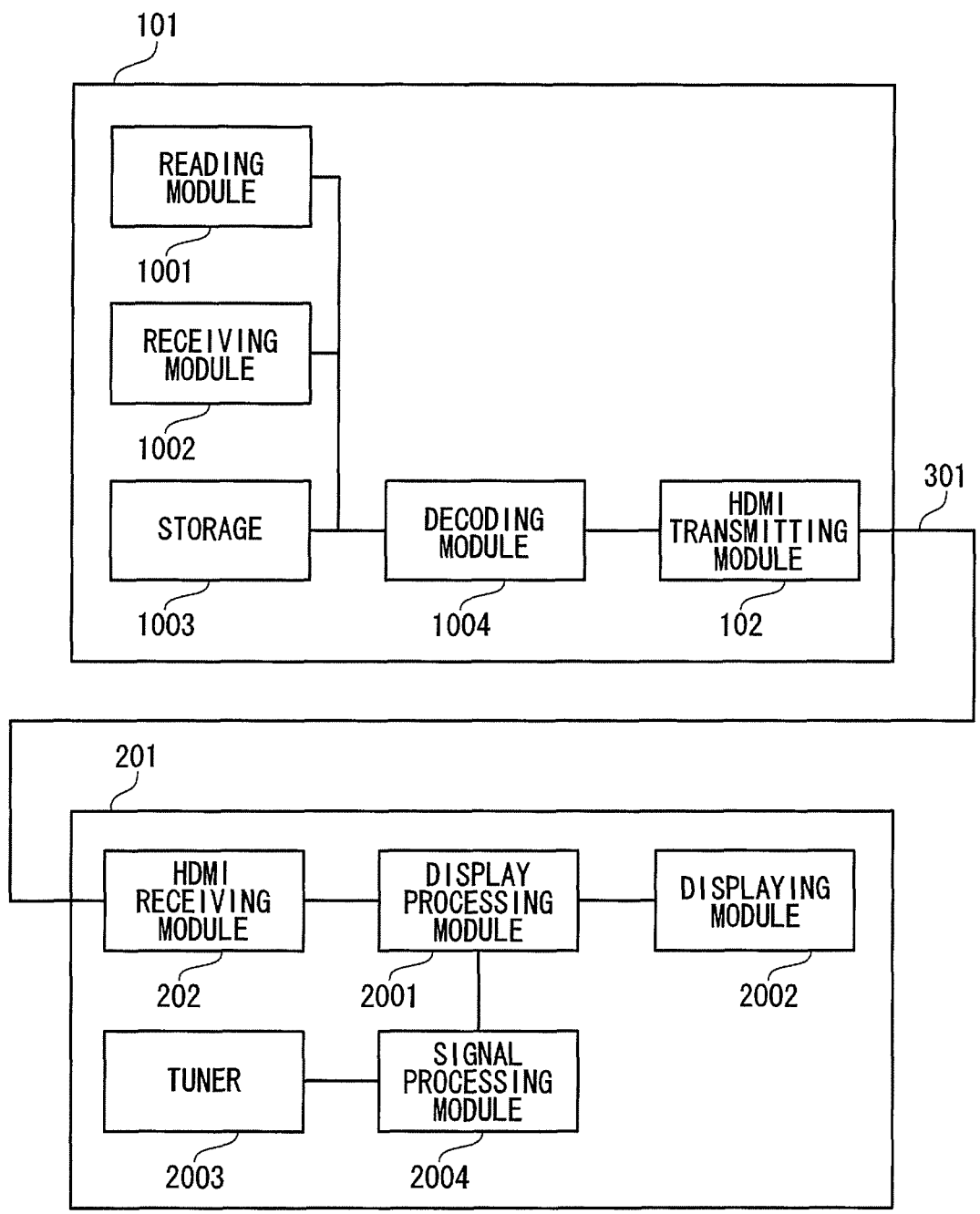
FIG. 13 is a view for illustrating an example of a system configuration of the HDMI source device according to the embodiment.

FIG. 13 is a view illustrating a configuration example of a system of the HDMI source device 101 and the HDMI sink device 201.

The HDMI source device 101 includes a reading module 1001, a receiving module 1002, storage 1003, a decoding module 1004, and the HDMI transmitting module 102. The reading module 1001 reads-out the encoded image data stored in an optical disk to output the encoded image data to the decoding module 1004. Further, the receiving module 1002 has a function of receiving an encoded image data of, for example, terrestrial digital broadcasting wave or satellite digital broadcasting wave, as the tuner, or receiving an encoded image data of IP TV delivered via the Internet, and outputs the received data to the decoding module 1004. The storage 1003 stores, for example, the recorded encoded image data, and outputs the encoded image data having recorded therein to the decoding module 1004. The decoding module 1004 decodes the inputted encoded image data into, for example, an image data of the respective 8-bit RGB components. Further, the decoding module 1004 outputs a base band data of the 8-bit RGB to HDMI transmitting module 102. The HDMI transmitting module 102 converts the decoded image data into a predetermined transmission format to output the converted image to the HDMI sink device 201 via the HDMI cable 301.

The HDMI sink device 201 contains the HDMI receiving module 202, a display processing module 2001, a displaying module 2002, a tuner 2003, and a signal processing module 2004. The HDMI receiving module 202 receives a signal representing an image and converts into an image data in a format (e.g., base band data of the respective 8-bit RGB components) capable of being processed by the display processing module 2001. Further, the display processing module 2001 converts the image data input from the HDMI receiving module 202 or the display processing module 2001 into an image signal in a format capable of being displayed by the display processing module 2001 and outputs the converted image signal to the displaying module 2002. The displaying module 2002 displays the image using the input image signal.

The tuner 2003 receives the encoded image data of the terrestrial digital broadcasting wave or BS digital broadcasting wave. The signal processing module 2004 decodes the encoded image data and converts the decoded image data into an image data to be output to the display processing module 2001.

Second Embodiment

Next, the second embodiment of the present invention will be explained. In the first embodiment, the HDMI source device 101 compensates the levels of the differential signal so that the DC components of the differential signal to be outputted maintain the constant values. An HDMI source device 101c according to this embodiment compensates the levels of the differential signal so that the DC components of the differential signal to be outputted have waveforms similar to those of the DC components of the differential signal outputted in the HDMI configuration of the related art illustrated in FIG. 3. In other words, the HDMI source device 101c according to this embodiment corrects the levels of the differential signal in a manner that the DC component of the signal outputted from the positive (+) side of a differential signal line has a waveform similar to that of the waveform P6 illustrated in FIG. 7, (2) and the DC component of the signal outputted from the negative (−) side of the differential signal line has a waveform similar to that of the waveform P8 illustrated in FIG. 7, (2).

Figure 14A:
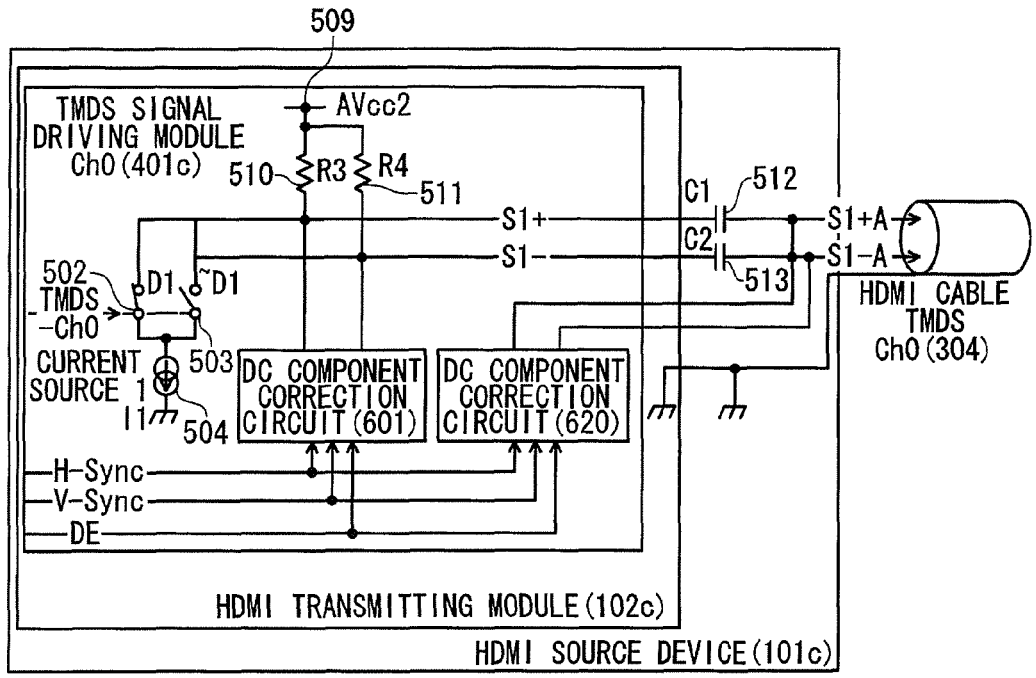
FIGS. 14A and 14B are views for illustrating an example of a circuit configuration of the HDMI transmitting module of the HDMI source device according to the second embodiment.
Figure 14B:
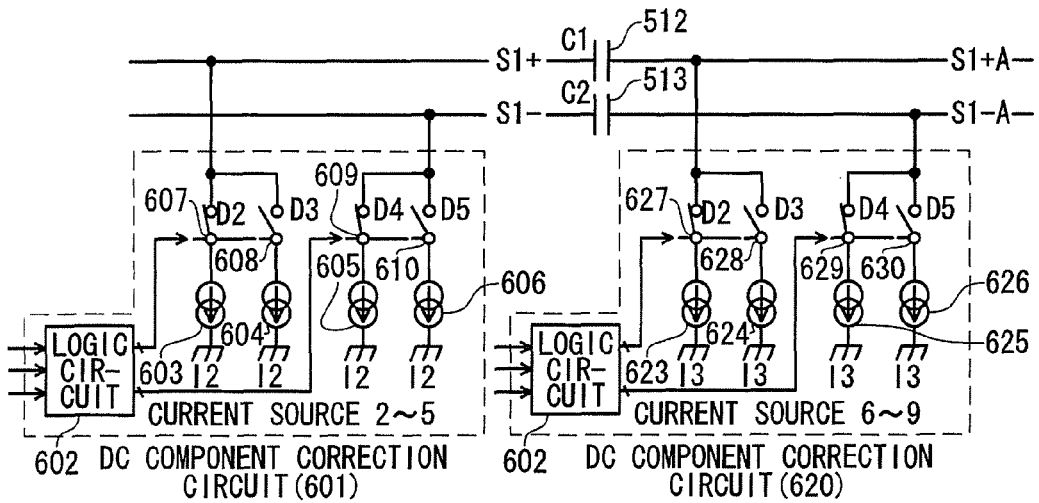

FIGS. 14A and 14B are views for illustrating an example of a circuit configuration of the HDMI source device 101c according to the second embodiment. The HDMI source device 101c corresponds to the HDMI source device 101 explained in the first embodiment. Thus, in FIG. 14, portions operating in the similar manner to those explained in the first embodiment are referred to by the common symbols, respectively.

A TMDS signal driving module 401c includes a DC component compensation circuit 620 having the similar configuration to that of the DC component compensation circuit 601, in addition to the respective configuration of the TMDS signal driving module 401 explained in FIG. 9 of the first embodiment. The DC component compensation circuit 620 has a function of, together with the DC component compensation circuit 601 explained in the first embodiment, correcting the DC component of each of the single ended signals (the positive (+) side signal and the negative (−) side signal of the differential signal line) of the differential signal outputted to the Ch0 transmission line 304.

The DC component compensation circuit 601 is connected to the switch 502, 503 side when seen from the capacitors 512, 513. This DC component compensation circuit corrects the levels of the single ended signals (the positive (+) side signal and the negative (−) side signal of the differential signal line) of the differential signal supplied to the differential signal line (internal signal line) within the HDMI source device 101c by using the current source 1 and the switches 501, 503 to thereby generate signals S1+ and S1−, respectively. On the other hand, the DC component correction circuit 620 is connected to the HDMI cable side when seen from the capacitors 512, 513 of the differential signal line (internal signal line). In other words, the DC component correction circuit 601 is connected to the one sides of the capacitors 512, 513 and the DC component correction circuit 620 is connected to the other sides of the capacitors 512, 513. The DC component compensation circuit 620 supplies predetermined driving currents to the signals S1+, S1− passed through the capacitors 512, 513 to thereby generate signals S1+A, S1−A, respectively. These signals S1+A, S1−A are outputted to the HDMI cable which is connected to the differential signal line (internal signal line) within the HDMI source device 101c.

Each of the DC component compensation circuits 601, 620 is supplied with the H-Sync, V-sync and the DE which are inputted into the TMDS transmitting module 104. The DC component compensation circuits 601 and 620 switch the driving currents to be applied to S1+, S1− and S1+A, S1−A at the timings based on the signals inputted thereto, respectively. Although configuration similar to this configuration is added to each of the TMDS signal driving modules 402, 403, the description thereof is omitted. In FIG. 14, although the HDMI sink device 201 is not illustrated, the HDMI source device 101 is also connected to the HDMI sink device 201 in FIG. 14.

As explained in the first embodiment, the DC component compensation circuit 601 contains the logic circuit 602, the current source 603, the current source 604, the current source 605 and the current source 606, and the switch 607, the switch 608, the switch 609 and the switch 610 etc. which perform the ON/OFF switching of the currents from these current sources, respectively. The logic circuit 602 switches the currents of the current sources in accordance with the states (state 0 to state 3) of the input control signals H-Sync, V-Sync and DE to thereby perform the compensation of the first compensation level illustrated in FIG. 15 with respect to the respective levels of the single ended signals (the positive (+) side signal and the negative (−) side signal of the differential signal line) supplied to the differential signal line from the current source 1 via the switches 502 and 503. The current value of each of the current source 603, the current source 604, the current source 605 and the current source 606 is I2.

The current values switched by the switches 607 and 608 are combined and added to an amount of the current from the current source 504 which is ON/OFF switched by the switch 502. Then the resultant current is converted into a voltage by the resistor 510 and the voltage drives the positive (+) terminal of the Ch0 transmission line 304 of the HDMI cable through the capacitor 512. Further, the current values switched by the switches 609 and 610 are combined and added to an amount of the current from the current source 504 which is ON/OFF switched by the switch 503. Then, the resultant current is converted into a voltage by the resistor 511 and the voltage drives the negative (−) terminal of the Ch0 transmission line 304 of the HDMI cable through the capacitor 513.

The DC component compensation circuit 620 has the similar configuration as the DC component correction circuit 601. This DC component correction circuit includes the logic circuit 622, the current source 623, the current source 624, the current source 625 and the current source 626, and the switch 627, the switch 628, the switch 629 and the switch 630 etc. which perform the ON/OFF switching of the currents from these current sources, respectively. The logic circuit 622 switches the currents of the current sources in accordance with the states (state 0 to state 3) of the input control signals H-Sync, V-Sync and DE to thereby perform the correction of the second correction level illustrated in FIG. 15 with respect to the respective levels of the signals passed through the capacitors 512 and 513. The current value of each of the current source 623, the current source 624, the current source 625 and the current source 626 is I3.

The current values switched by the switches 607 and 608 are combined and added to the signal S1+ passed through the capacitor 512, and the resultant signal (S1+A) drives the positive (+) terminal of the Ch0 transmission line 304 of the HDMI cable. Further, the current values switched by the switches 629 and 630 are combined and added to the signal S1− passed through the capacitor 513, and the resultant signal (S1−A) drives the negative (−) terminal of the Ch0 transmission line 304 of the HDMI cable.

FIG. 15 is a view illustrating the compensation levels performed by the DC component compensation circuits 601 and 620. The first compensation level is the correction level performed by the DC component compensation circuit 601 and the second compensation level is the compensation level performed by the DC component compensation circuit 620.

When the ratio of the number of the logic 1 to the number of the logic 0 within 10 bits of the TMDS signal (bit serial data) inputted into the TMDS signal driving module 401c is 5:5 (states 0 and 1), the DC component compensation circuit 601 reduces the levels of the DC components of the TMDS signals inputted into the differential signal line by 5% to thereby generate the S1+ and S1−, respectively. In this case, the DC component compensation circuit 620 reduces the levels of the DC components of the signals S1+ and S1− passed through the capacitors 512 and 513 by 5% to thereby generate the S1+A and S1−A, respectively.

When the ratio of the number of the logic 1 to the number of the logic 0 within 10 bits of the TMDS signal inputted into the TMDS signal driving module 401c is 4:6 (state 2), the DC component correction circuit 601 does not compensate the levels of the DC components of the TMDS signals inputted into the differential signal line. That is, in this case, the TMDS signals inputted into the differential signal line become the S1+ and S1−, respectively. Then, the DC component correction circuit 620 reduces the levels of the DC components of the signals S1+ and S1− passed through the capacitors 512 and 513 by 10% to thereby generate the S1+A and S1−A, respectively.

When the ratio of the number of the logic 1 to the number of the logic 0 within 10 bits of the TMDS signal inputted into the TMDS signal driving module 401c is 6:4 (state 3), the DC component compensation circuit 601 reduces the levels of the DC components of the TMDS signals inputted into the differential signal line by 10% to thereby generate the S1+ and S1−, respectively. In this case, the DC component compensation circuit 620 does not perform the level compensation.

Figure 16B:
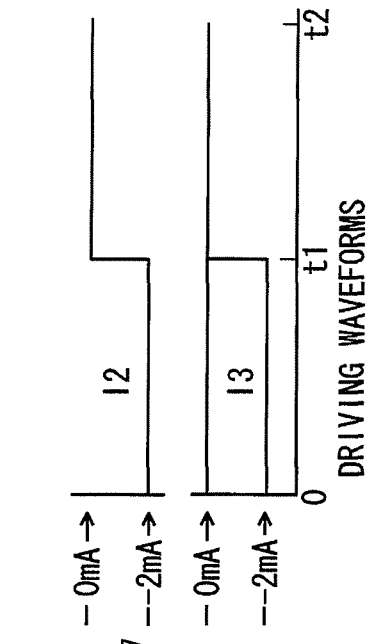
FIGS. 16B, 16C, and 16D are timing charts for illustrating the concept of the basic operation of FIGS. 14A and 14B according to the second embodiment.
Figure 16A:
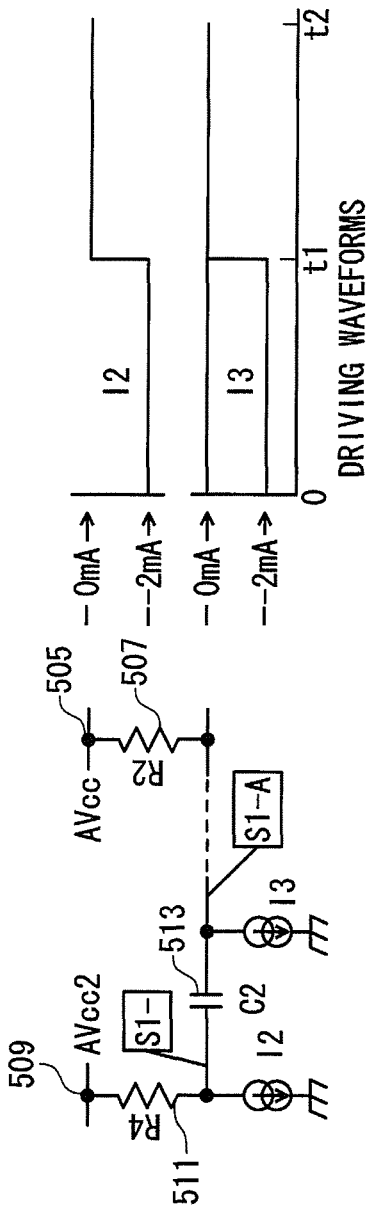
FIG. 16A is a circuit diagram for illustrating a concept of the basic operation of FIGS. 14A and 14B according to the second embodiment.
Figure 16C:
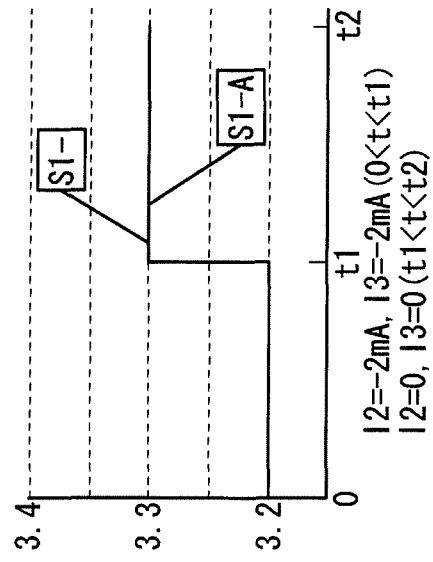
Figure 16D:
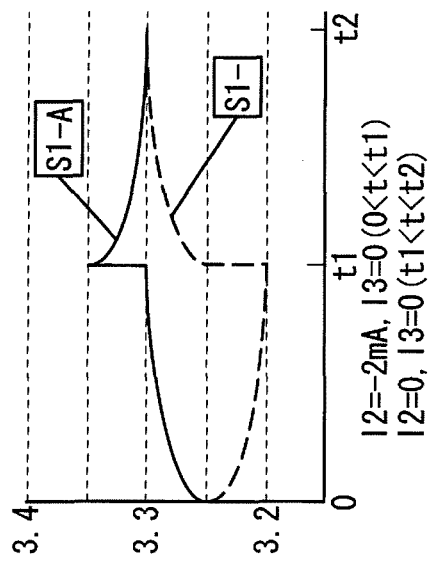

FIG. 16A is a circuit diagram for illustrating the concept of the basic operation of FIGS. 14A and 14B according to the second embodiment. FIGS. 16B, 16C, and 16D are timing charts for illustrating the concept of the basic operation of FIGS. 14A and 14B according to the second embodiment.

The circuit diagram illustrated in FIG. 16A shows a part of the circuit relating to the negative (−) side of the differential signal line. Further, in the actual configuration, the resistor 507 (R2) pulling up the signal from the switch 503 to the AVcc corresponds to the resistor 507 (R2) pulled up to the AVcc 505 in FIG. 4. Also, the resistor R4 pulled up to the AVcc2 corresponds to the resistor 511 (R4) pulled up to the AVcc2 509 in FIG. 4. The resistor 507(R2) and the resistor 511 (R4) are coupled via the capacitor 513. The resistance value of each of the resistors 507 and 511 is 50Ω. Although this circuit differs from the actual circuit, this circuit can be explained simply in this manner since the signal band under consideration is the change of the DC component. However, the operation explained with reference to FIGS. 16A, 16B, 16C, and 16D relates to the basic operational concept and contains a part different from the actual operation of the HDMI source device 101c. The operation of the HDMI source device 101c will be explained later with reference to FIGS. 17A, 17B, and 17C.

The current source I2 in FIG. 16A is a representative one of the current sources 2 to 5 within the DC component correction circuit 601 in FIG. 14, and also the current source I3 is a representative one of the current sources I3 within the DC component correction circuit 620 in FIG. 14. In other words, I2 represents the driving current outputted to the negative (−) side of the differential signal line from the DC component compensation circuit 601, and I3 represents the driving current outputted to the negative (−) side of the differential signal line from the DC component compensation circuit 620.

FIG. 16B shows the waveforms of the current sources I2 and I3. In this figure, a section from a time point 0 to a time point t1 represents the state 2, and a section from the time point t1 to a time point t2 represents the state 3. Further, in this figure, minus means the drawing current. During the time period 0~t1~t2, although I2 is −2 mA during the time period from 0 to t1, I3 is 0 or −2 mA during this time period. −2 mA corresponds to the 10% shown as the first compensation level and the second reduction level shown in FIG. 15, and also corresponds to 10% of the output value 20 mA of I1 of the current source 1 in FIGS. 3, 4 and 9. During the time period t1~t2, each of I2 and I3 is 0.

FIG. 16C shows the response waveforms at the S1− terminal and the S1−A terminal in the case where I2 is −2 mA and I3 is 0 during the time period from 0 to t1, and each of I2 and I3 is 0 during the time period from t1 to t2. That is, this figure represents the waveforms in the case where the DC component correction circuit 601 is driven but the DC component correction circuit 620 is not driven. According to another point of view, FIG. 16C shows the waveforms of the DC components in the case of performing the AC coupling without compensating the DC component like FIG. 4 although the signal amplitude differs therefrom. In other words, according to this point of view, the waveform S1−A of FIG. 16C corresponds to the DC component waveform P14 at the receiving terminal shown in FIG. 7, (4).

Supposing that the output state changes to the state 2 from the state 3 at the time point t=0, since I2 changes from 0 mA to −2 mA at the time point t=0, the S1−A terminal waveform (steady line) at the time point t=0 becomes AVcc−2 mA× (resistance value of the parallel arrangement of R2 and R4)=3.3V−2 mA×2.5Ω=3.3V−0.05V=3.25V. Then the S1−A terminal waveform (steady line) gradually approaches to AVcc=3.3V with time. The S1− terminal waveform (dotted line) at the time point t=0 becomes AVcc−2 mA×(resistance value of the parallel arrangement of R2 and R4)=3.25V and gradually approaches to AVcc2−2 mA×50Ω=3.3V−100 mV=3.2V with time.

During the time period from t1 to t2 in FIG. 16C, since I2 changes to 0 mA from −2 mA at the time point t=t1, the S1−A terminal waveform and the S1− terminal waveform gradually approach to the voltage AVcc and AVcc2, that is, 3.3V with time, respectively.

In the case where I2 is 0 A and I3 is −2 mA during the time period from 0 to t1, and each of I2 and I3 is 0 during the time period from t1 to t2, the S1−A terminal waveform and the S1− terminal waveform in this case will be the S1− terminal waveform and the S1−A terminal waveform of FIG. 16C, respectively. This is because the resistance value of R2 is same as that of R4 and the current value of I2 is same as that of I3.

FIG. 16D shows the response waveforms at the S1− terminal and the S1−A terminal in the case where I2 is −2 mA and I3 is −2 mA during the time period from 0 to t1, and each of I2 and I3 is 0 during the time period from t1 to t2. In this case, each of the waveforms at the S1− terminal and the S1−A terminal becomes the sum of the S1−A voltage waveform and the S1− voltage waveform in FIG. 16C. That is, since the signals each having the same current value and the same waveform are simultaneously applied to the both terminals of the coupling capacitor, the voltages at the both terminals thereof become always same.

In this manner, the S1− waveform shown in FIG. 16D is the objective waveform having the DC component same as the DC component (not appearing transient phenomenon), except for the offset level, at the time of the DC coupling at the S1− terminal in the timing chart (5) of the TMDS signal driving module in FIG. 5.

Figure 17A:
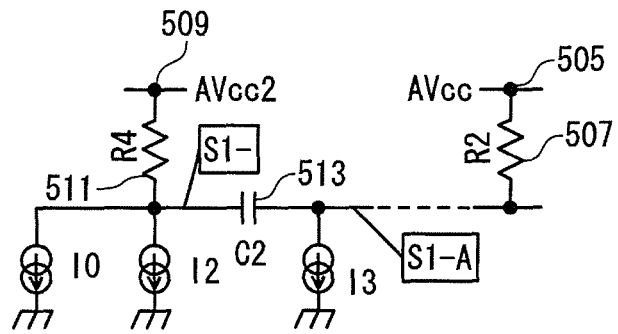
FIG. 17A is a circuit diagram for illustrating an example of the operation of the HDMI source device shown in FIGS. 14A and 14B according to the second embodiment.
Figure 17B:
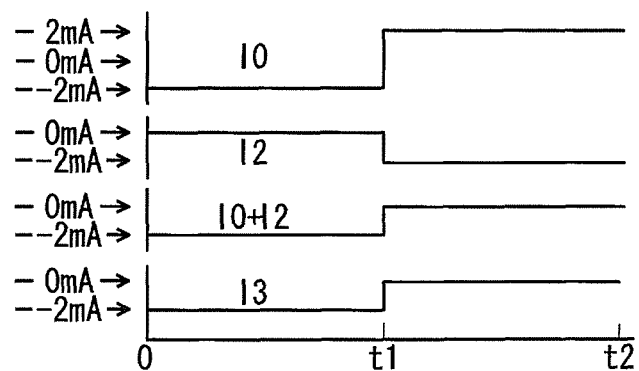
FIGS. 17B and 17C are timing charts for illustrating the example of the operation of the HDMI source device shown in FIGS. 14A and 14B according to the second embodiment.
Figure 17C:
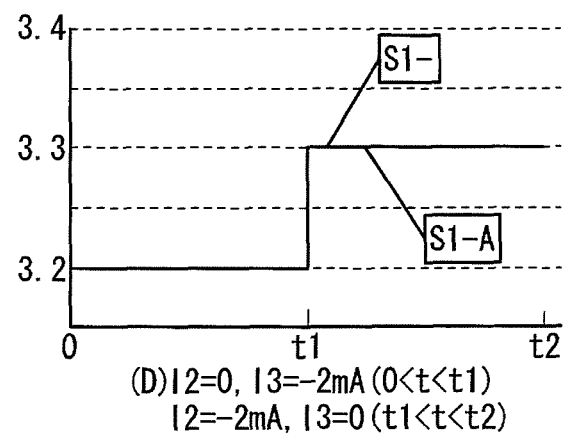

FIG. 17A is a circuit diagram for illustrating an example of the operation of the HDMI source device shown in FIGS. 14A and 14B according to the second embodiment. FIGS. 17B and 17C are timing charts for illustrating the example of the operation of the HDMI source device shown in FIGS. 14A and 14B according to the second embodiment.

FIG. 17A shows a part of the circuit configuration, in the configuration shown in FIG. 14, relating to the negative (−) side of the single ended signal line of the differential signal. Although a current source I0 not shown in FIG. 14 is added, this current source is supposed to output the DC component of the current of the TDMS signal inputted into the single ended signal line of the differential signal. In other words, the DC component P8 of the S1− waveform in FIG. 7, (2) is equivalently represented as this current source.

FIG. 17B is the timing charts showing the operations of the DC component compensation circuits 601 and 620 of this embodiment. These timing charts show the case where the section from the time point 0 to the time point t1 represents the state 3, and the section from the time point t1 to the time point t2 represents the state 2.

I0 represents the waveform of the DC component contained in the TMDS signal inputted into the negative (−) side of the differential signal line and the changing level thereof is 20% as also shown in FIG. 7, (2). In these timing charts, minus means the drawing current. Supposing that the peak value (PP value) of the TMDS waveform is 500 mVpp, the changing value 20% thereof corresponds to 100 mVpp. When this value is converted into a current value for driving the parallel arrangement of the resistors 507(R2) and 511(R4) having a composite resistance value of 25Ω, the absolute value of the level of the driving current of the current source I0 becomes 100 mVpp/25Ω=4 mA. The current source I0 changes the driving current value into either one of −2 mA and 2 mA, and the changing timing thereof is a timing where H-Sync changes, for example, as clear from FIG. 7.

I2 represents the waveform of the driving current outputted to the negative (−) side (single ended) of the differential signal line from the DC component compensation circuit 601. That is, as shown by the first compensation level in FIG. 15, the DC component is not compensated in the state 2, whilst the DC component is reduced by 10% (50 mVpp) in the state 3. In other words, the DC component compensation circuit 601 supplies, to the negative (−) side of the differential signal line, the driving current of 0 mA during the time period from 0 to t1, and the driving current of −2 mA during the time period from t1 to t2.

I0+I2 represent the current waveform showing the DC component of the S1− signal in FIG. 14. This current waveform has a changing amount of 2 mApp in total from −2 mA to 0 mA.

I3 represents the waveform of the driving current outputted to the negative (−) side (single ended) of the differential signal line from the DC component compensation circuit 620. That is, as shown by the second compensation level in FIG. 15, the DC component is reduced by 10% (50 mVpp) in the state 2, whilst the DC component is not corrected in the state 3. In other words, the DC component compensation circuit 620 supplies, to the negative (−) side of the differential signal line, the driving current of −2 mA during the time period from 0 to t1, and the driving current of 0 mA during the time period from t1 to t2.

FIG. 17C shows the response waveforms at the S1− terminal and the S1−A terminal in the case where I0+I2 is −2 mA and I3 is −2 mA during the time period from 0 to t1, and each of I0, I2 and I3 is 0 during the time period from t1 to t2. In this case, since the signals each having the same current value and the same waveform are simultaneously applied to the both pins of the capacitor, the voltages at the both pins of the coupling capacitor become always the same.

Each of the waveforms shown in the timing charts in FIG. 17C is the objective waveform having the DC component same as the DC component (DC component in the case where the transient phenomenon at the time of the AC coupling does not appear), except for the offset level, at the time of the DC coupling at the S1− terminal in the timing chart (5) of the TMDS signal driving module in FIG. 5.

In this manner, in the HDMI source device 101c according to this embodiment, since the current waveform (I0+I2) having the DC component obtained by the first compensation and the current waveform (I3) subjected to the second compensation and having the same DC component as the aforesaid current waveform are applied to the both sides of the coupling capacitor, respectively, the differential signal having the DC component similar to that obtained at the time of the DC coupling can be outputted to the external device despite of performing the AC coupling.

In other words, according to the HDMI source device 101c, the DC component compensation circuit 601 suppresses the level of the DC component originally contained in the TMDS signal to a half thereof, and the DC component compensation circuit 620 extends the level of the DC component thus suppressed by an amount corresponding to a half of the DC component originally contained in the TMDS signal As a result, the transient of the DC component at the terminals S1+A and S1−A appeared in FIG. 7, (4) can be suppressed, and the waveform of the DC component at the time of the DC coupling appeared in FIG. 7, (3) can be obtained. In this manner, according to the configuration of FIG. 14, despite of performing the AC coupling, the DC component level at each of the S1+A and S1−A terminals is almost the same as the DC component level at the time of performing the DC coupling. Thus, as compared with the case of not performing the compensation of the DC component (FIG. 4 and FIG. 7, (4)) and the case of partially performing the compensation of the DC component (FIG. 9 and FIG. 10), the signal transmission having no deterioration can be performed even with respect to the sink devices designed according to the DC coupling specification of the related art.

In FIGS. 17A, 17B and 17C, although the explanation is made as to the negative (−) side of the differential signal line, the HDMI source device 101c also performs the similar correction as to the positive (+) side thereof. That is, when I0 is imputed into the positive (+) side of the differential signal line, the DC component correction circuit 601 and the DC component compensation circuit 620 supply I2 and I3 to the positive (+) side of the differential signal line, respectively.

Further, in FIGS. 17A, 17B and 17C, although the explanation is made that the signals each having the same current value and the same waveform are simultaneously applied to the both terminals of the capacitor, the current values and the waveforms at the both terminals of the capacitor do not necessarily become the same since each of the sink device side resistor R2, the source device side resistor R4, and the current values I0, I2 and I3 varies. However, the degree of the coincidence of the current values and the waveforms at the both terminals of the capacitor may be such a degree that the sink device designed according to the DC coupling specification of the related art can perform the differential detection without causing error as to the differential signal outputted from the HDMI source device 101c. To be more concrete, each of R4, I1, I2 and I3 has the variance of about 5% relatively due to the variance within the same LSI, and R2 is permitted to have a variance of 35% according to the standard thereof. Thus, the current values at the both terminals of the capacitor cause the error of about 40% at the maximum, for example. The influence of the error will be explained as to the waveform in the following manner. That is, when there is the influence of the aforesaid error of 40% with respect to the peak value 100 mVpp of the rectangular waveform component shown in FIG. 16D, the rectangular waveform component becomes 60 mVpp. In other words, when there is the influence of the error of 40% with respect to the changing value 50 mVpp of the transient component shown in FIG. 16C, the rectangular transient component becomes 20 mVpp. This resultant transient component does not raise a practical problem. In short, even when the DC component compensation circuit 601 and the DC component compensation circuit 620 perform the correction with the driving voltage amounts shown in FIG. 15 and FIG. 17B in the case where there is the maximum error to be supposed, it is considered that there does not arise a practical problem.

Such a configuration may be incorporated that the DC component at the S1+A or S1−A terminal as the output terminal of the HDMI source device 101c is automatically measured, and the correction amount due to the variances of the pull-up resistors R1, R2 on the sink side having large variances is adjusted by automatically adjusting the current value of the current source I3 (623 to 626) of the DC component compensation circuit 620. In other words, the HDMI source device 101c may incorporate a circuit for detecting the DC component at the S1+A or S1−A terminal at the time of being coupled to the sink device and a circuit for controlling the current value of the current source I3 of the DC component correction circuit 620 in accordance with the detected DC component so that the voltage difference between the both terminals of the capacitor becomes small. Alternatively, DC component compensation circuit 620 may incorporate the circuit for detecting the DC component.

While the embodiments of the present invention have been described, the embodiments are exemplary, and are not intended to limit the scope of the invention. The embodiments can be embodied in various types in addition to the above-described embodiments, and various omissions, substitutions and modifications thereof can be made without departing from the gist of the invention. The embodiments, modifications thereof, and combination of the embodiments are included in the scope of the appended claims and equivalent ranges thereof, similarly as being included in the scope or gist of the invention.

What is claimed is:

1. A signal transmission apparatus configured to be AC-coupled with a receiving apparatus through a digital transmission line, comprising;
a transmitting module configured to transmit a differential signal based on an encoded bit serial input signal such that a low frequency component of the differential signal to be transmitted is maintained at a constant level when the differential signal based on the encoded bit serial input signal is transmitted to the digital transmission line,
wherein the encoded bit serial input signal contains a ratio of the number of logic 1 to the number of logic 0 per ten bits that is different from a 5:5 ratio.

2. The signal transmission apparatus of claim 1, wherein the transmitting module compensates a waveform of the differential signal to be transmitted so that the low frequency component of the differential signal is maintained at the constant level.

3. The signal transmission apparatus of claim 2, wherein the transmitting module transmits the differential signal by increasing respective amplitudes of signals contained in the differential signal by amplification factor corresponding to a correction amount for the compensated waveform correction.

4. The signal transmission apparatus of claim 1, wherein when the ratio of the number of logic 1 to the number of logic 0 of the encoded bit serial input signal varies, the transmitting module transmits the differential signal so that the low frequency component is maintained at the constant level before and after the ratio varies.

5. The signal transmission apparatus of claim 1, wherein the encoded bit serial input signal is a Transmission Minimized Differential Signal (TMDS) encoded signal, and
the digital transmission line is a line compliant with High-Definition Multimedia Interface (HDMI) standard.

6. A signal transmission method in a signal transmission apparatus configured to be AC-coupled with a receiving apparatus through a digital transmission line, comprising;
transmitting a differential signal based on an encoded bit serial input signal such that a low frequency component of the differential signal to be transmitted is maintained at a constant level when the differential signal based on the encoded bit serial input signal is transmitted to the digital transmission line,
wherein the encoded bit serial input signal includes a ratio of the number of logic 1 to the number of logic 0 per ten bits that is different from a 5:5 ratio.

7. The signal transmission method of claim 6, further comprising transmitting the differential signal after compensating a waveform of the differential signal so that the low frequency component of the differential signal is maintained at the constant level.

8. The signal transmission method of claim 7, further comprising transmitting the differential signal after increasing respective amplitudes of signals contained in the differential signal by amplification factor corresponding to a compensation amount for the compensated waveform correction.

9. The signal transmission method of claim 6, when the ratio of the number of logic 1 to the number of logic 0 of the encoded bit serial input signal varies, transmitting the differential signal so that the low frequency component is maintained at the constant level before and after the ratio varies.

10. The signal transmission method of claim 7, when the ratio of the number of logic 1 to the number of logic 0 of the encoded bit serial input signal varies, transmitting the differential signal so that the low frequency component is maintained at the constant level before and after the ratio varies.

11. The signal transmission method of claim 8, when the ratio of the number of logic 1 to the number of logic 0 of the encoded bit serial input signal varies, transmitting the differential signal so that the low frequency component is maintained at a constant level before and after the ratio varies.

12. The signal transmission apparatus of claim 6, wherein the encoded bit serial input signal is a Transmission Minimized Differential Signal (TMDS) encoded signal, and
the digital transmission line is a line compliant with High-Definition Multimedia Interface (HDMI) standard.

13. A signal transmission apparatus configured for AC-coupling with a receiving apparatus through a digital transmission line, comprising:
a supply circuit configured to output a differential signal based on an encoded bit serial input signal to an internal signal line to be connected to a digital transmission line;
a capacitor provided at the internal signal line;
a first compensation circuit configured to be coupled to the internal signal line on a first side of the capacitor, and to supply a first driving amount to the internal signal line when a ratio of a number of logic 1 to a number of logic 0 per ten bits of the encoded bit serial input signal is different from a 5:5 ratio; and
a second compensation circuit configured to be coupled to the internal signal line on a second side of the capacitor, and to supply a second driving amount to the internal signal line when the ratio of the number of logic 1 to the number of logic 0 per ten bits of the encoded bit serial input signal that is different from a 5:5 ratio.

14. The signal transmission apparatus of claim 13, wherein the first driving amount in the case where the ratio of the number of logic 1 to the number of logic 0 of the encoded bit serial input signal is 6:4 is substantially same as the second driving amount in the case where the ratio of the number of logic 1 to the number of logic 0 of the encoded bit serial input signal is 4:6.

15. The signal transmission apparatus of claim 13, wherein a temporal waveform, having an amount corresponding to a sum of a DC component contained in each of single ended signals of the differential signal outputted to the internal signal line and a DC component of the first driving amount, is substantially same as a temporal waveform having a DC component of the second driving amount.

16. The signal transmission apparatus of claim 13, further comprising:
a detection circuit configured to detect an amount of a DC component contained in a single ended signal of the differential signal of the internal signal line on a second side of the capacitor, wherein
the second compensation circuit adjusts the second driving amount in accordance with the amount of DC component detected by the detection circuit.

17. The signal transmission apparatus of claim 13, wherein the encoded bit serial input signal is a Transmission Minimized Differential Signal (TMDS) encoded signal, and
the digital transmission line is a line compliant with High-Definition Multimedia Interface (HDMI) standard.

* * * * *